US008407298B2

(12) United States Patent
Kamat et al.

(10) Patent No.: US 8,407,298 B2
(45) Date of Patent: Mar. 26, 2013

(54) DIRECT ACCESS ELECTRONIC MAIL (EMAIL) DISTRIBUTION AND SYNCHRONIZATION SYSTEM WITH OUT-OF-COVERAGE NOTIFICATION

(75) Inventors: Harshad N. Kamat, Maple Valley, WA (US); Sarinder Virk, Issaquah, WA (US)

(73) Assignee: Research In Motion Limited, Waterloo, Ontario (CA)

(*) Notice: Subject to any disclaimer, the term of this patent is extended or adjusted under 35 U.S.C. 154(b) by 538 days.

(21) Appl. No.: 12/023,079

(22) Filed: Jan. 31, 2008

(65) Prior Publication Data
US 2008/0256204 A1 Oct. 16, 2008

Related U.S. Application Data

(60) Provisional application No. 60/911,611, filed on Apr. 13, 2007.

(51) Int. Cl.
*G06F 15/16* (2006.01)
*H04L 12/58* (2006.01)
(52) U.S. Cl. .............. 709/206; 709/219; 455/412.1
(58) Field of Classification Search .......... 709/206, 709/219; 455/412.1
See application file for complete search history.

(56) References Cited

U.S. PATENT DOCUMENTS

| | | | | |
|---|---|---|---|---|
| 6,208,717 B1* | 3/2001 | Yeh et al. | .................. | 379/88.18 |
| 6,779,019 B1 | 8/2004 | Mousseau et al. | ............. | 709/206 |
| 6,959,325 B2 | 10/2005 | Gardner et al. | ............... | 709/206 |
| 7,043,240 B2 | 5/2006 | Clarke et al. | ............... | 455/432.2 |
| 7,107,310 B2 | 9/2006 | McCarthy | ...................... | 709/203 |
| 7,111,047 B2 | 9/2006 | McCarthy et al. | ............ | 709/206 |
| 7,162,223 B2 | 1/2007 | Kamat | ....................... | 455/412.1 |
| 7,206,816 B2 | 4/2007 | Gorty et al. | ................... | 709/206 |
| 7,222,228 B1* | 5/2007 | Stephens et al. | ................. | 713/1 |
| 7,289,495 B2 | 10/2007 | Roy | ............................ | 370/381 |
| 7,289,975 B2 | 10/2007 | Clarke et al. | ..................... | 707/1 |
| 7,383,549 B1* | 6/2008 | Draganic | ..................... | 719/310 |
| 2005/0041652 A1* | 2/2005 | Roy | ............................ | 370/381 |
| 2005/0108075 A1* | 5/2005 | Douglis et al. | .................. | 705/8 |
| 2005/0245239 A1* | 11/2005 | Haumont et al. | .............. | 455/413 |
| 2007/0072589 A1 | 3/2007 | Clarke | ......................... | 455/414.1 |
| 2007/0073813 A1 | 3/2007 | Kamat et al. | .................. | 709/206 |
| 2007/0073814 A1 | 3/2007 | Kamat et al. | .................. | 709/206 |
| 2007/0073817 A1 | 3/2007 | Gorty | ............................ | 709/206 |

(Continued)

FOREIGN PATENT DOCUMENTS
WO 99/65256 12/1999

OTHER PUBLICATIONS

Anonymous: "Blackberry Internet Service, Version 2.0, Feature and Technical Overview," Internet Citation, XP002428620, URL: http://www.blackberry.com/btsc/article/s/KSM/ProductDocumentation/English/Blackberry_Internet_Service_v2_Feature_and_Technical_Overview.pdf (26 pages), Mar. 27, 2006.

*Primary Examiner* — Ranodhi Serrao
(74) *Attorney, Agent, or Firm* — Allen, Dyer, Doppelt, Milbrath & Gilchrist, P.A.

(57) ABSTRACT

A communications system includes a network engine that communicates with a plurality of user subscribed mobile wireless communications devices and operative for determining when a mobile wireless communications device is out-of-coverage or turned off and unable to communicate with the network engine. A direct access server is operative with the network engine and polls electronic mailboxes of the users and retrieves electronic messages from the electronic mailboxes and pushes any electronic messages through the network engine to selected user subscribed mobile wireless communications devices. The direct access server suspends polling of those electronic mailboxes of a user when a mobile wireless communications device associated with a user has been determined to be out-of-coverage or turned off and unable to communicate so as to preserve polling resources within the direct access server.

15 Claims, 16 Drawing Sheets

U.S. PATENT DOCUMENTS

2007/0073819 A1 3/2007 Gardner et al. .............. 709/206
2007/0078934 A1 4/2007 Gardner ....................... 709/206
2007/0083599 A1 4/2007 Provo ........................... 709/206
2007/0226301 A1 9/2007 Provo ........................... 709/206

* cited by examiner

DIRECT ACCESS ELECTRONIC MAIL (EMAIL) DISTRIBUTION AND SYNCHRONIZATION SYSTEM WITH OUT-OF-COVERAGE NOTIFICATION

RELATED APPLICATION

This application is based upon prior filed provisional application Ser. No. 60/911,611 filed Apr. 13, 2007.

FIELD OF THE INVENTION

The present invention relates to the field of communications systems, and, more particularly, to electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein by reference. This system pushes user-selected data items from a host system to a user's mobile wireless communications device upon detecting the occurrence of one or more user-defined event triggers. The user may then move (or file) the data items to a particular folder within a folder hierarchy stored in the mobile wireless communications device, or may execute some other system operation on a data item. Software operating at the device and the host system then synchronizes the folder hierarchy of the device with a folder hierarchy of the host system, and any actions executed on the data items at the device are then automatically replicated on the same data items stored at the host system, thus eliminating the need for the user to manually replicate actions at the host system that have been executed at the mobile wireless communications device.

The foregoing system advantageously provides great convenience to users of wireless email communication devices for organizing and managing their email messages. Yet, further convenience and efficiency features may be desired in email distribution and synchronization systems as email usage continues to grow in popularity.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A communications system includes a network engine that communicates with a plurality of user subscribed mobile wireless communications devices and operative for determining when a mobile wireless communications device is out-of-coverage or turned off and unable to communicate with the network engine. A direct access server is operative with the network engine and polls electronic mailboxes of the users and retrieves electronic messages from the electronic mailboxes and pushes any electronic messages through the network engine to selected user subscribed mobile wireless communications devices. The direct access server suspends polling of those electronic mailboxes of a user when a mobile wireless communications device associated with a user has been determined to be out-of-coverage or turned off and unable to communicate so as to preserve polling resources within the direct access server.

Figure 1:
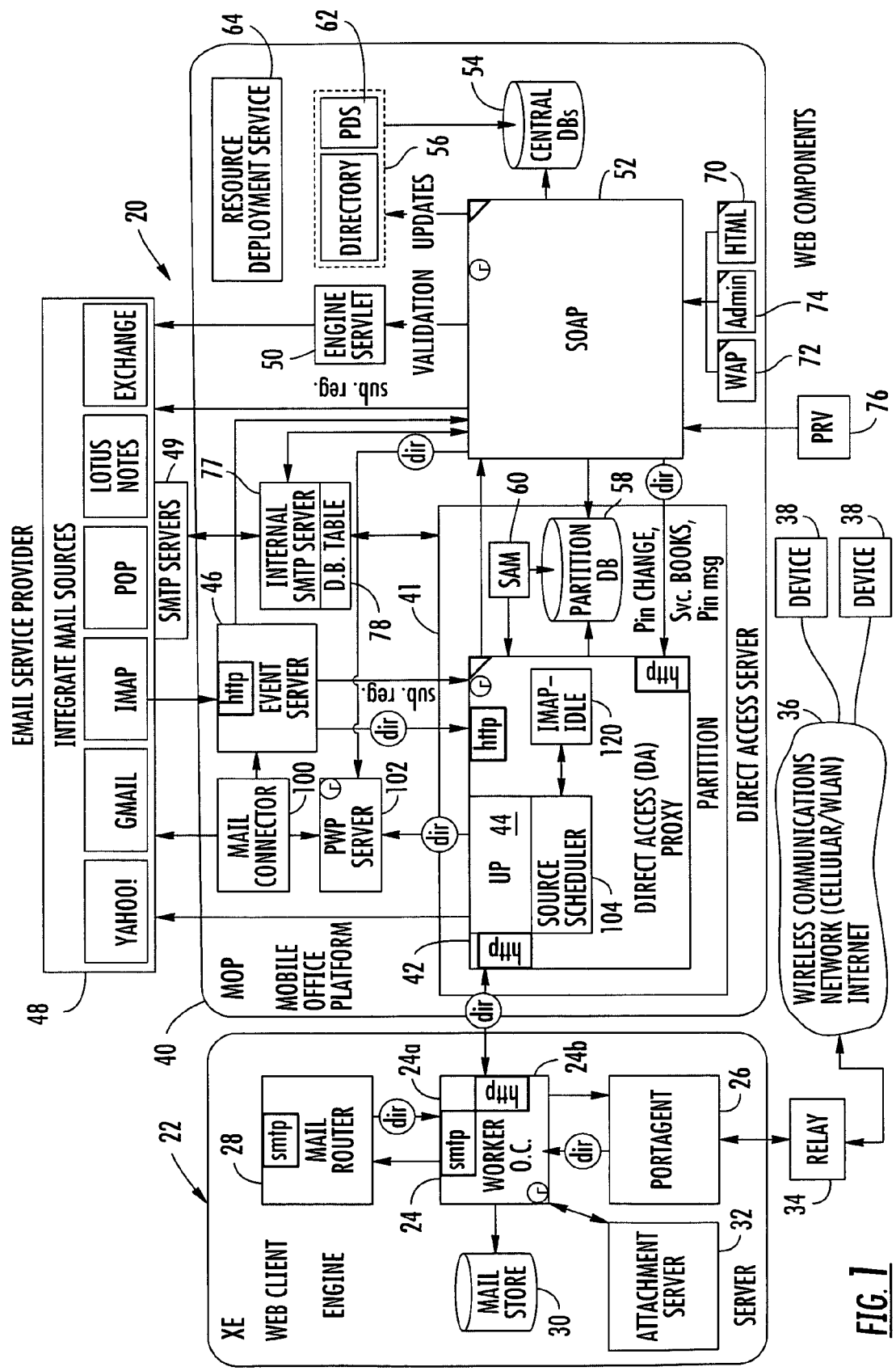
FIG. 1 is a schematic block diagram of a direct access electronic mail (email) distribution and synchronization system in accordance with non-limiting examples.

Basic components of the Direct Access email system 20 are shown in FIG. 1. The web client or network engine 22 has various components. The worker 24 is a processing agent that is responsible for most processing in the engine 22 and includes SMTP and HTTP server support. It determines out-of-coverage information (O.C.) as explained later. It accepts email from the DA proxy and external mail routers, formats email in CMIME, and sends it to the port agent 26 and other components. The port agent 26 acts as a transport layer between the email system infrastructure and the rest of the engine 22. The mail router 28 is an MTA (Mail Transfer Agent) and is responsible for relaying messages into the mail store 30, which are destined for hosted subscribers. It is also responsible for accepting/relaying email notifications.

The mail store 30 is a MIME message store that resides on a central storage system to provide support for more/forward/reply and attachment viewing features. The attachment server 32 provides service for documents/attachment conversion requests from workers.

The symbol "dir" that is attached to a line illustrates that a directory lookup has been made to determine the service instance to call, for example, which the DA proxy can retrieve an email for a particular pin/servicebook. The symbol "r" attached to a component illustrates that it registers itself with a directory of PDS. The triangular attachment on the WAP and HTML components illustrates that it is a client of a Resource Deployment Service.

The Relay 34 with the Wireless Communications Network 36, such as a cellular network or WLAN and cooperates with a Port Agent 26 using GUID. The Network 36 communicates with one or more wireless communications devices 38, such as portable wireless communications devices.

The mobile office platform 40 has different components. The DA proxy (DA) 42 includes service through which integrated source messages are delivered to or retrieved from by the worker 24. It is responsible for polling sources such as mailboxes, processing source notifications and retrieval and update of source messages via the universal proxy 44. The universal proxy (UP) 44 abstracts access to disparate mail stores into a common protocol. The event server 46 is a lightweight process on a server that receives notifications from external sources (ISPs and SMC) and different user mailboxes and processes them asynchronously without blocking the sender of notifications. The integrated mail sources 48 as email service providers include non-limiting examples such as Yahoo!, Gmail, IMAP, POP, Lotus Notes, and Exchange. SMTP servers 49 are associated with the email service providers as explained in greater detail below. The engine servlet 50 is a high performance service on the server capable of validating a large number of integrated sources concurrently. This engine 50 is used in a source integration process to validate the access settings to a mailbox. The SOAP 52 is a primary interface to query, update and modify data in the central and partition databases 54, 58. It also implements business logic that triggers other workflows in the system (e.g., send, delete service books). The central database 54 stores system wide data related to sites/carriers, mailbox providers (AOL, Yahoo), service books, devices and user accounts. The partition database 58 is a primary data store for users. It stores data for a fixed set of users. The directory 56 is a system responsible for assigning, locating and distributing users and their associated workloads across service instances. The source assignment manager (SAM) 60 assigns sources to the DA proxy 42 for the purposes of mail detection (polling, subscribing, etc.). The PDS (PWP directory service) 62 is a registry of PWP servers and is responsible for load balancing mail connector (MC) clients across PWP server instances.

Any PWP server and mail connector components are used together to access mailboxes when the system is unable to directly access an external mail source (e.g., source is behind corporate firewall). The Resource Deployment System (RDS) 64 allows the dynamic deployment of new brand and language specific resources.

There are also various UI/web components. The HTML proxy 70 provides an HTML user interface for users to manage their account. The WAP proxy 72 provides a WML and XHTML user interface for users to manage their account. The WEB ADMIN and ADMIN 74 proxy provides an HTML user interface for carriers to perform administrative functions on their customer accounts. A desktop client is deployed via a device CD, and allows the user to integrate sources with a native Win32 UI. A device client allows the user to integrate sources using a java based UI on the device. Provisioning (PRV) 76 can also occur. Also illustrated is the internal SMTP server 77 operative with a database table 78 and associated with the MOP. A source scheduler 104 and IMAP-Idle connection module (manager) 120 are shown and explained in greater detail later.

Figure 2:
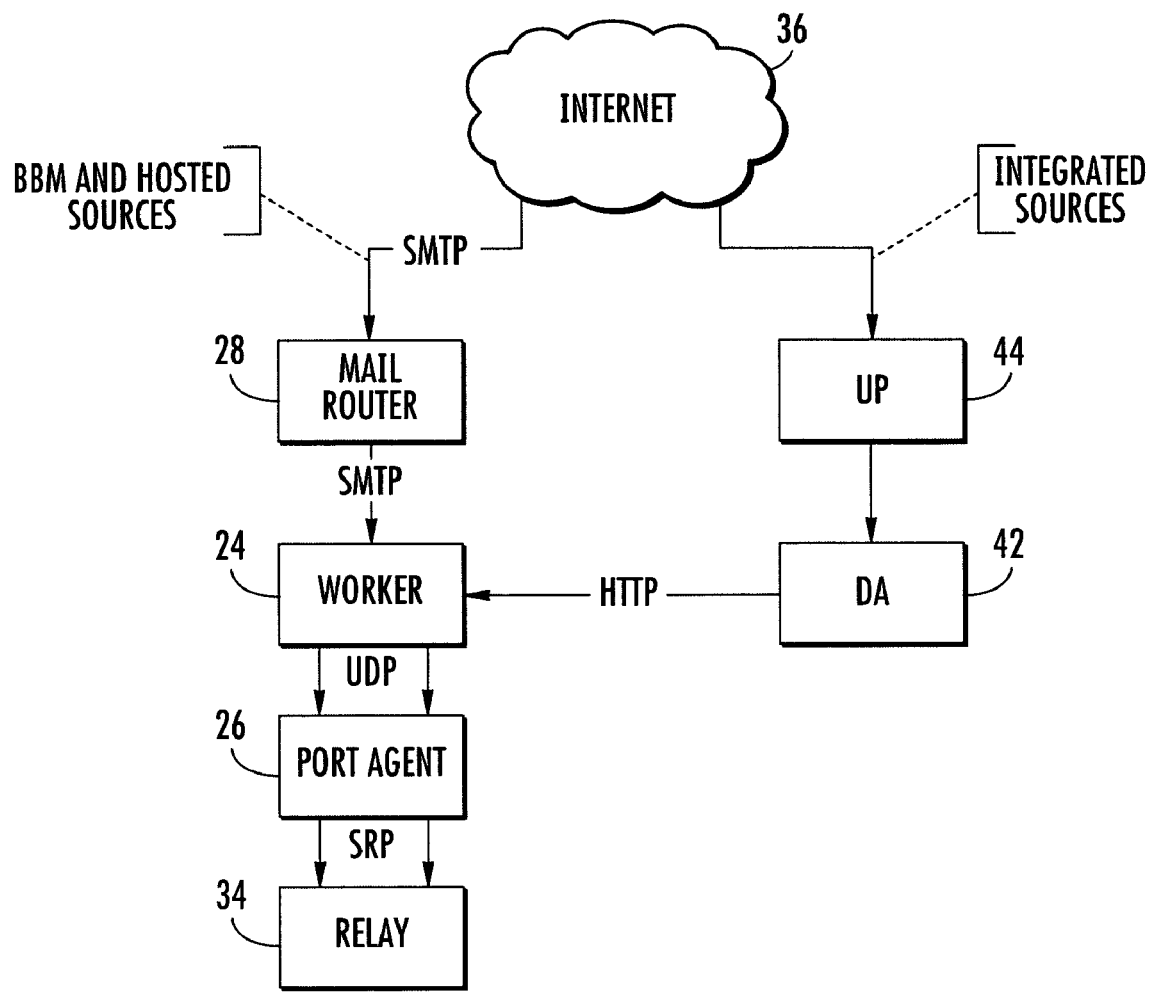
FIG. 2 is a network architecture diagram for message to handheld (MTH) messages.

As shown in FIG. 2, there are two possible message paths for message to handheld (MTH) messages. The first path is via an external mail router via SMTP. This path is used for all BUM and hosted sources. All messages will arrive to the network engine 22 via mail router 28, which will make a directory lookup then forward the message to the appropriate worker 24. The worker 24 will process the message and send the message to the least loaded port agent 26. Finally, the port agent 26 will deliver the message to the relay 34, which will in turn send the message to the device 38.

The second path is via the Universal and DA proxies 42, 44. This path is used for all integrated sources. When the DA Proxy 42 detects a new mail from an integrated source the DA proxy 42 will fetch the message via the Universal Proxy 44, make a directory lookup for the appropriate worker and push the message to the worker. The worker will then perform the same operation it did for hosted mail.

Figure 3:
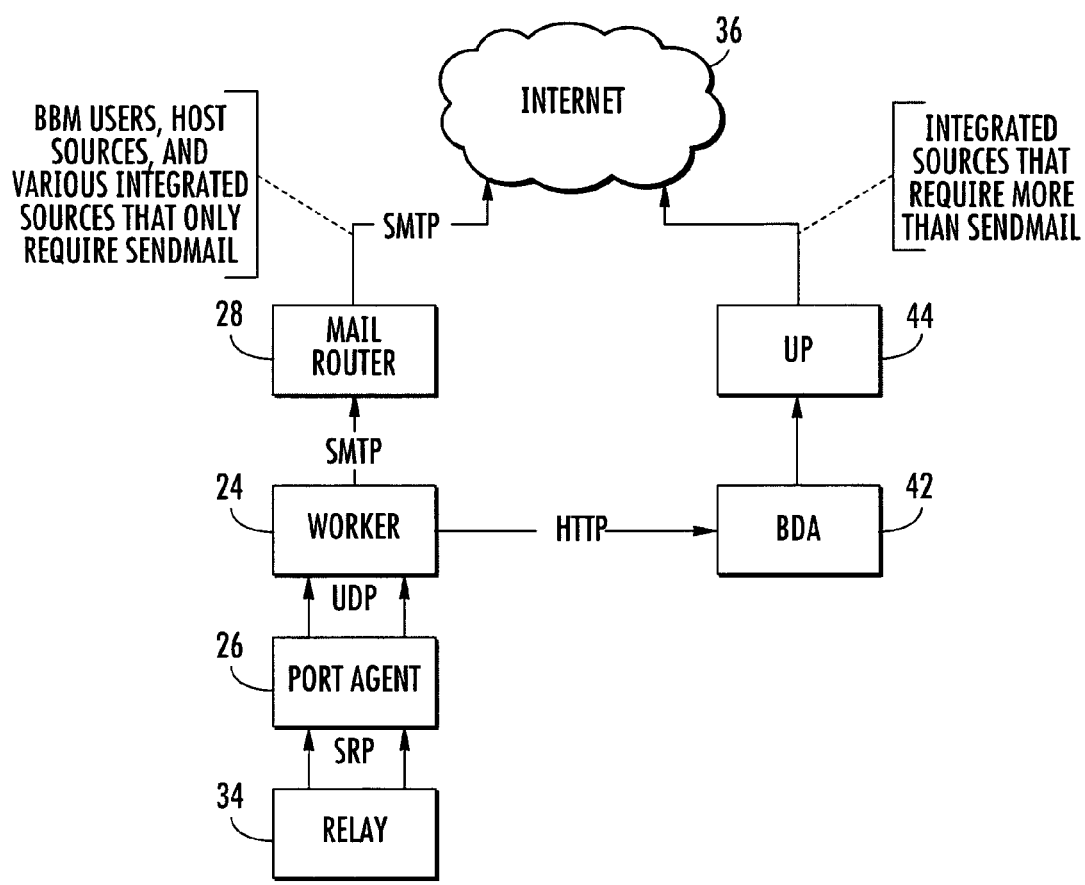
FIG. 3 is a network architecture diagram for message from handheld (MFH) messages.

As shown in FIG. 3, there are two possible routing paths for a message from handheld (MFH). The first is sent through a mail router 28. This path is used for hosted sources. This path will also be used for a subset of integrated sources that do not require any functionality greater than sendmail. The Relay 34 will receive the message from the device 38 and then forward the message to the port agent 26. The port agent 26 will make a directory lookup and send the message to the appropriate worker 24. The worker 24 will then decode the message and send it to the mail router 28 which will in turn deliver the message to the destination mailbox.

The second path is through the DA proxy 42. This path is required for integrated sources that require more functionality than sendmail provides. For example, google sources require messages to be sent via gmail SMTP servers to provide support for a sent folder. Following the same path to the worker as hosted mail, the worker will make a directory lookup and send the message to the appropriate DA proxy 42. The DA proxy 42 will then compose an HTTP Mail request for sending a message which will be passed to the universal proxy 44, which will translate the HTTP Mail request into an appropriate format for sending the mail either thru an external mail router or thru a protocol dependant on the source type (e.g., HTTP Mail for exchange). Any routers could be external.

The worker 24 is a main component of the network engine 22. The worker 24 is responsible for converting messages between MIME and CMIME, encrypting and decrypting messages, compressing and decompressing messages, and attachment viewing.

The worker 24 will support user affinity. The advantages of this are that the system has a global pool of workers, rather than partitioning users by cell. This will allow the workers to scale horizontally in an N+1 manner. It will also make better usage of a pending job limit per service book. It will also reduce the user cache size within the worker.

The workers 24 will register with the Directory 56. For all MTH, the mail router will contact the Directory 56 to determine which worker 24 to route messages. For all MFH, the port agents 26 will contact the Directory 56 to determine which worker to route the messages. The Directory 56 will load balance users across workers 24. The system is simplified by having only one component handling user affinity and load balancing. The workers will implement mail filters.

The worker 24 will store a cache in a memory of all known user records. This cache will reduce the number of "Get ServiceBook" requests to the DA proxy 42. The worker 24 will support an HTTP notification to remove a record from its cache (sent when a record is updated). There will be a hard timeout for each cached record. This hard timeout will force a record to be removed from the cache after a preset amount of time (approximately one day, but this is configurable). The purpose of this time out is to remove unused records from the cache when a user is load balanced to another worker. The hard timeout will also safe guard against lost notifications (stale records).

The worker 24 will accept messages through two protocols, SMTP and HTTP, as illustrated at 24a and 24b. All messages for a device messenger and hosted sources will arrive via SMTP. The messages will arrive at any mail routers 28. The mail router 28 will lookup the appropriate worker 24 in the Directory 56 and route the message to the corresponding worker via SMTP. All messages for integrated sources will be sent to the worker via HTTP. The message will be delivered as a new mail notification. The notification will include the MIME message as well, rather than just a message identifier. Both protocols will implement a delayed Acknowledgment (ACK). The worker 24 will not ACK the incoming source until either the message has been delivered to the device 38, or the message has been paged to disk on a timer. The worker typically will not block any threads while waiting for the ACK to be sent. The DA proxy 42 typically will not block its client thread while waiting to receive the ACK.

The job stores will be stored on a central storage. Each worker will maintain its own sandbox for storing CMIME messages. The worker 24 will implement the delayed ACK paradigm that was implemented in a device messenger. Under this paradigm, the worker 24 will not store the CMIME messages immediately, but rather it will schedule a timer to write the job to disk. If the job is completed before the timer fires, then the timer is cancelled and the job is not written to disk. If the job does not complete before the timer fires, then the job is written to disk. The worker 24 will not ACK the message source (SMTP or HTTP) until either the job is completed, or the job is paged to disk. If the worker 24 crashes before the job is ACK'd (completed or paged), then the original message source is responsible for retrying the job. If the worker crashes after the job is ACK'd then the worker is responsible for retrying the job, by recovering the CMIME job from disk. The recovery method will be used for messenger users, hosted mail, and integrated mail sources.

All recovery in the worker 24 will be done via the CMIME jobstore. When a worker 24 is started it will scan its jobstore for any jobs that were in progress when the worker previously shutdown. The worker 24 will then proceed to resume the processing of these jobs. Under this strategy it is possible for more than one worker to access the same mailbox. All new messages for the mailbox will be delivered to the current active worker (via the Directory component). However, any in progress jobs will be processed by the original worker. This can lead to users exceeding their pending job limit, since each worker manages its own limit. However, this will only occur while the jobs are being recovered, and will not affect new jobs.

The port agent 26 is responsible for GME encoding/decoding of CMIME messages, sending messages to and receiving messages from relay. The port agent 24 can optionally compress and encrypt MTH messages.

A Message to Handheld (MTA) is responsible for accepting messages into the system for hosted mail accounts and relaying them to an appropriate worker. The MTA will allow directory queries through a standard LDAP interface which will utilize the MTA's built in lookup mechanisms for envelope re-writing. The need for external software in order to interface with the directory will be eliminated, which will decrease overall complexity. The MTA will have the ability to cap/limit connections from either the incoming or delivery channel, which can be tuned to adhere to the connection profile of the MIME Mail Store.

The MIME Mail Store 30 will be a central storage solution that is shared by all workers. A MIME message store can be added to the worker. This will support MORE/FORWARD/REPLY and attachment viewing. The mail store will reside on central storage via a NetApp or other SAN to allow any worker to access any message from any user and support dynamic load balancing of users between workers. There could be one mailbox per service book. Some messages may not need to be stored in the mail store. Messages that are smaller than the MORE truncation point that do not contain attachments do not need to be stored in the mail store 30. Messages that are not stored in the mail store can be delivered to the device 38 with a flag that tells the device to forward messages with their original content, rather than by reference ID. This optimization will reduce the load on any central storage.

NetApp or another application can be used to achieve a central storage solution. It is possible that a single NetApp will not be able to handle the load of the entire user space. When this occurs another NetApp can be added to the infrastructure. To accommodate this, a new column can be added to the user database, which will describe which mount point the mailbox resides on. A load balancing scheme can be used to determine which NetApp to use when adding a new mailbox. Before the engine 22 can access the mail store for a given mailbox it will first lookup the mount point in the database, and then proceed to access the mailbox. This will allow the system to scale the NetApps out horizontally using an N+1 scaling methodology.

The mail store 30 can store messages using a reference ID as its unique identifier. Reference IDs are not guaranteed to be unique across service books. Therefore, each service book should have its own box. The reference ID is used because all MORE/FORWARD/REPLY and attachment requests include the original reference ID.

Messages are typically compressed before being saved to disk in the MIME Mail Store 30. Performance tests have demonstrated that one viable compression library is LZO compression. Using LZO compression will reduce the load on the network, the load on the central storage, and the total storage space required. This will allow the system to support the same number of users while using less hardware in the central storage. The LZO compression can be configured on/off. Some messages may not benefit from compression (for example messages with JPEG attachments). The Mail Store 30 can implement optimizations to determine which messages should be compressed and which should not be compressed based on the nature of the content of the message. This optimization can reduce the load on the host CPU.

Each mailbox can have an auto-aging index that will track quota usage and dictate the order in which messages should be removed from storage when the quota is exceeded. The mail store 30 will store both hosted and integrated mail. The quota for the integrated mailboxes will be small (enough to store one day worth of mail on average).

When a message is added to the mail store the quota is analyzed, and if the limit is reached then one or more messages are removed from the mailbox to free enough space for the new message.

The Data store is divided into a central database 54 and multiple Partition databases 58. Logically the central database 54 contains-all system wide data and a directory of all user accounts. Physically, the central database 54 can be divided among different databases. The user account data contains enough information to lookup the account, by various external ids (e.g., SUBID, PIN, Mailbox), to determine which partition database 58 contains the detailed user data.

The system wide data stored in a central database could include information about:
 a) Sites/carriers e.g., tmobile, cingular;
 b) Mailbox providers (aol, yahoo);
 c) Service books;
 d) Device information; and
 e) Hosted Mailbox mappings.

The central database 54 is accessed by the SOAP component 52 and by the Directory 56. The central database should be scaled up to handle an ever-increasing number of users. A minimum amount of data is stored in the central database and request loads are limited by the caching of its data in the Directory component 56.

A partition database 58 contains data related to a user account and integrated sources such as: integrated sources, alert rules, signature and similar items. The partition database also contains some global data replicated from the central database 54 to keep the central database 54 load to a minimum, e.g., service books. The bulk of the data in the partition database 58 is in the tracking of message UIDs for each integrated source. This table is potentially updated each time a source is polled. The partition database is accessed via SOAP 52 and the DA proxy 42. The partition database is the main scaling mechanism of the data store. It handles a fixed number of users. As the number of users increases more partitions can be added allowing the system to scale out.

The Directory 56 is a system responsible for assigning and resolving a user to service instance for services that require some level of user affinity. The assignments are evenly distributed across all service instances of a particular type. Whenever a request is to be sent to a service the service instance should be resolved via the Directory. The Directory 56 distributes the affinities evenly across all service instances of a particular type. The Directory supports DA Proxy and Worker lookups. A DA Proxy instance can be assigned users of the partition it is servicing. The Worker can be assigned any user.

The Directory 56 is actually a system of Directory Nodes. Each node shares the burden of storing user to service instance mappings and the network request load associated with lookups. The strategy is to assign a hash value to each node. As each directory lookup is made, the lookup key is hashed to one of the hash values and the directory instance assigned that hash value is forwarded the lookup to resolve the mapping. If a mapping does not exist for the lookup then the resolving will involve an assignment to a service instance.

Figure 4:
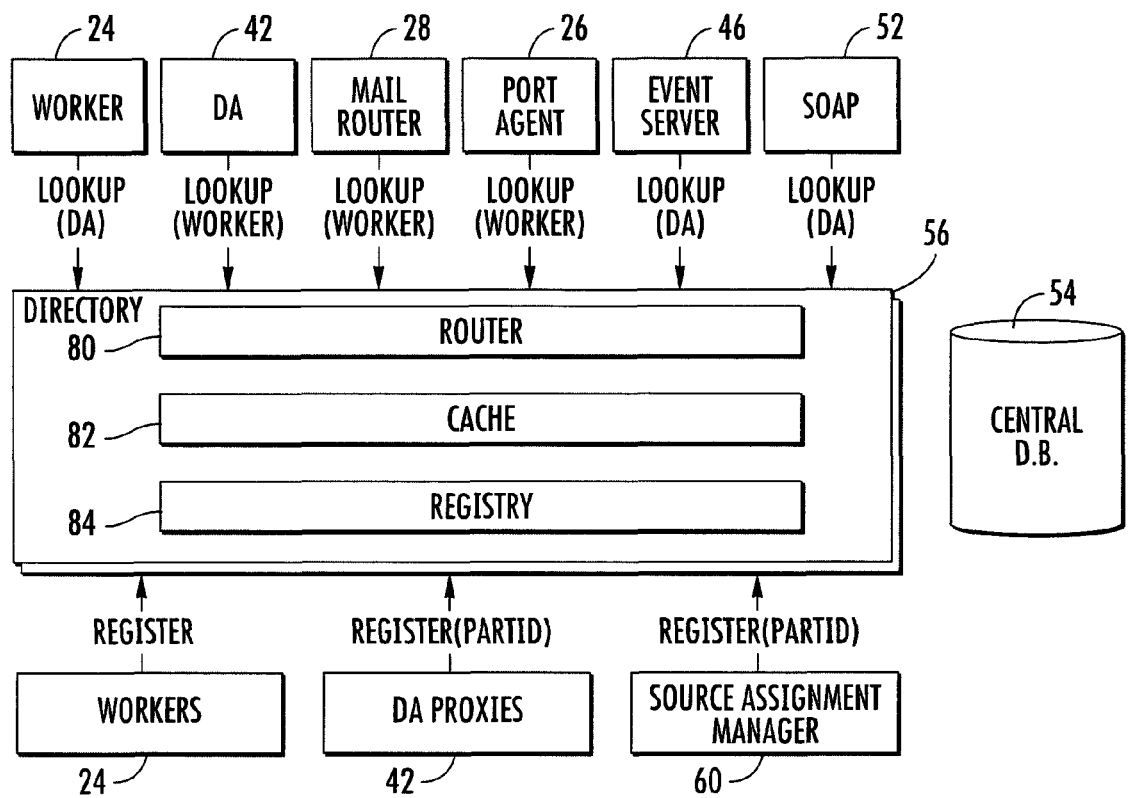
FIG. 4 is a block diagram showing a directory structure and other components used in the direct access email system shown in FIG. 1.

In FIG. 4, the Directory 56 is depicted with three logical components: the Router 80 for hashing the lookup key and forwarding to the appropriate directory instance; the Cache 82 which stores the mappings; and the Registry 84 which load balances across the registered service instances.

The Router 80 has a list of directory nodes and the hash value they map to. The hash value is simply an enumeration from 0 to N−1, where the N is the number of nodes. Each node will have the exact same table. The function of the Router 80 is to hash the incoming lookup key to a hash value and forwards the request to the node assigned that hash value. If the hash value is assigned to this node then the lookup is made in a node's Cache 82.

The Cache 82 contains a list of mappings between lookup keys and service instances. For the DA proxy, the lookup key is PIN. For a Worker, it is either the PIN or Email Address. For the worker, there are two keys identifying a user that can be used as the lookup key. These two keys will likely hash to different values and cause two mappings to be created for the same user. Because of this, one key must be designated as the primary key and all lookups via a secondary keys will result in a primary key which can then be used in a lookup to resolve the service instance.

All service instances create and maintain a connection with the Registry 84 to register their service. This connection is also used to detect service instance failures. The Registry 84 is also responsible for distributing assignments across service instances.

The Directory 56 supports two interfaces LDAP and an Extended LBAC interface. The LDAP interface is provided for the mail router to perform Worker lookups by email address. The mail router supports LDAP lookups and will drive how much of the LDAP interface is required for implementation.

When the DA proxy 42 discovers and downloads a new message from an integrated source it queries the Directory 56 for the worker 24 that will handle messages for the associated user. The query contains the PIN which the Directory router 80 hashes. If the hash result is its assigned hash id then it will process the request, if not it will forward the request to the Directory instance that is responsible for that hash result. The Directory handling that hash result will now check its map to see if a mapping exists for that PIN. If no mapping exists then a worker with the least number of mappings is selected and assigned to the PIN. The worker is then returned to the client. A similar process happens for PIN to DA Proxy 42.

When the Mail Router 28 receives a message it queries the Directory for the worker that will handle messages for the associated user. The query contains the Email address which the Directory hashes. If the hash result is its hash id then it will process the request. If not it will forward the request to the Directory instance that is responsible for that hash result. The Directory handling that hash result will now check its map to see if a mapping exists for that email address, if not a database query will be executed to retrieve the associated PIN. A lookup will now be executed for PIN to Worker. Once the lookup is complete the value may be cached and returned.

Figure 5:
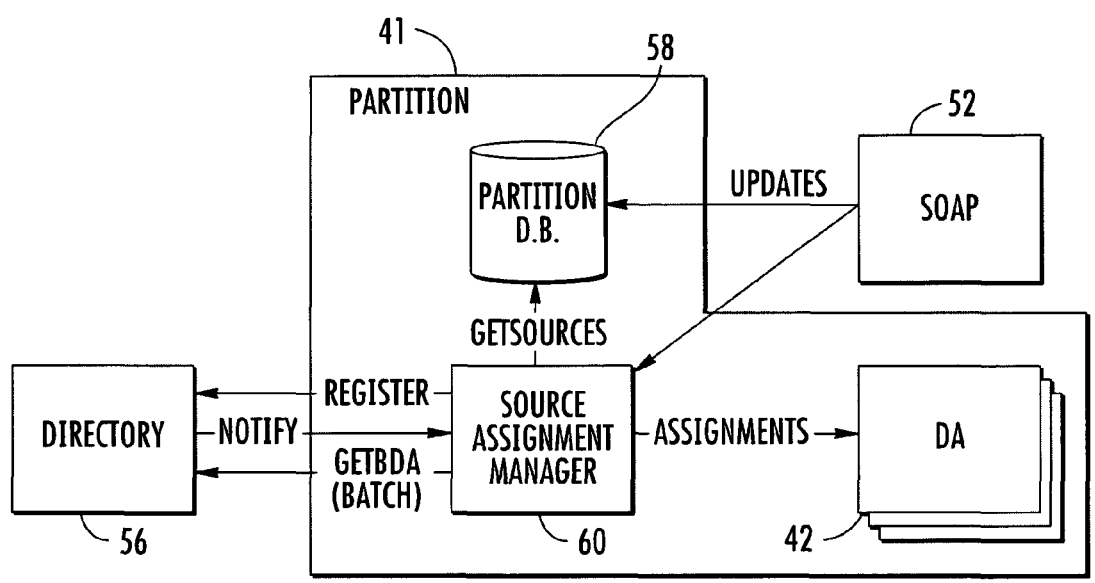
FIG. 5 is a block diagram showing basic components of a Source Assignment Manager as used in the direct access email system shown in FIG. 1.

The Source Assignment Manager 60 as shown in FIG. 5 is responsible for ensuring that the sources of a partition are being serviced by a DA Proxy 42 instance. The Source Assignment Manager 60 actively ensures that each source is assigned by the directory to a DA proxy 42 and that the DA proxy is notified of each source it is to service.

The Directory component 56 is responsible for assigning sources, via pin, to DA proxies 42. DA proxy assignments must be made pro-actively in-order for the polling process to begin, and should handle conditions arising from the loss of an assignment when a Directory instance goes down. It should ensure that all sources are being polled, should ensure that deleted sources stop being polled in a timely fashion. The Directory component 56 also ensures only one DA proxy is servicing any one particular source. Subscribeable sources that are eligible for subscription (e.g., not suspended) are subscribed. Operations must be able to track the state of polling queues and other measures of "health."

The partition database 58 places a timestamp on each source that specifies the last time the source was changed. Two queries are provided. The first query returns the entire list of sources with fields related to the servicing of the source (e.g., polling flags) and a timestamp that can be used in the second query. The second query, given a timestamp from the last query, returns all sources changed since the last query and another timestamp to use in the next query.

A polling manager as part of the DA proxy and source scheduler maintains a list of all sources belonging to its configured partition. For each source in the list it tracks data related to the servicing of the source, for the purposes of detecting updates, inserts and deletes. Furthermore, the DA proxy assignment is tracked to enable notifications of reassignment and/or lessen re-assignment (due to directory failure). A timestamp is also tracked. The timestamp is a value returned by the database that can be used to retrieve sources that have changed since the last query.

At startup a Polling Manager registers with the Directory 56 and makes a query to the configure partition database to retrieve all sources and the relevant data that drives the servicing logic of each source. The PIN of the sources is passed in one or more request batches to the Directory service to locate the DA proxy that will be servicing each source. This information is stored. Next a notification is sent to each DA proxy that has been assigned one or more sources, containing the sources the DA proxy should service.

In order to ensure that sources are being serviced, the Polling Manager at configured intervals queries the partition database 58 to retrieve all sources which may be new or changed based on a timestamp returned by the last query. The new timestamp can be used in the next query. The source list is compared with the query results to determine which sources have either been change, deleted or inserted. For inserted sources the Directory is called to retrieve the DA proxy assignment. A message is sent to all the DA proxies that have changes or additions to one or more sources they are servicing.

SOAP notifications are used to ensure that when a source is updated, deleted or inserted that it will be serviced in real time in accordance with the sources new state. The SOAP module 52 sends notifications to the Polling Manager by doing a lookup in the directory for the Polling Manager of the partition the source belongs to. The Polling Manager then sends a notification to the DA proxy servicing the source. SOAP Notifications are done via an HTTP Interface which the Polling Manager will implement.

When a Directory failure is detected, the Polling Manager is notified by the directory. The Polling Manager assumes that all of it sources may have been re-mapped. All sources are then looked up in the directory in one or more batches. If the Polling Manager is tracking the DA proxy assignment, then it can suggest to the Directory which direct access proxy it should map the source to in order to reduce the amount of reassignment.

When a DA proxy fails or a DA proxy is recovered, sources may be reassigned. The recovery reassignment is caused by the need to rebalance the load. When one of these events occur the Source Assignment Manager 60, of the failed/recovered DA partition, is notified by the Directory. The Polling Manger makes sure all sources are assigned to a DA proxy and that the DA proxy knows about it. This is done by iterating through all sources and making a directory lookup and notifying the DA proxies which sources have been reassigned and/or unassigned.

The SOAP component 52 provides a SOAP interface to query, update, modify and delete information from both central and partition databases. The SOAP component 52 exists in order to minimize the number of connections to the databases, provide abstraction to physical location (central vs. partition) and schema of data, and implement business logic for notifying components of data changes which can trigger other workflows such as:

a) PIN changes (tell DA proxy, Worker, and Directory);
    b) Account creation welcome message via the DA proxy;
    c) Integrated source add sends service book via DA; and
    d) Subscription requests.

It also provides APIs to enable integration with external systems and implement simple provisioning guessing logic via database rules and engine servlet.

The interfaces are grouped by function and also by the requirements of the external subsystems. Providing specific interfaces for each subsystems minimizes the affect on other systems when one system requires a change. Interfaces are defined as Web Services and are distributed as WSDL so that external subsystems so that there is not platform or language requirement imposed on the external subsystem.

Figure 6:
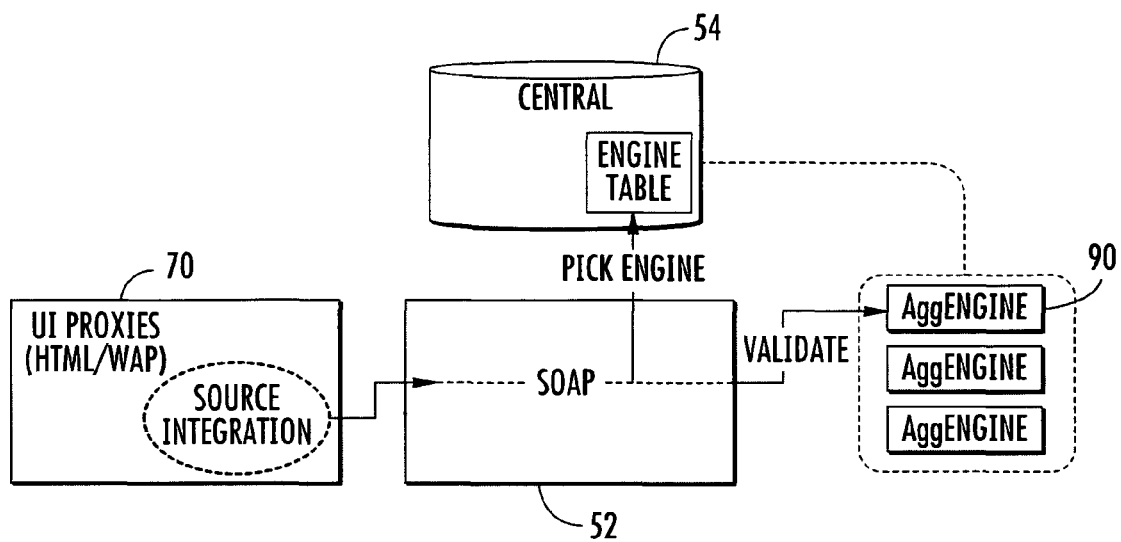
FIG. 6 is a block diagram showing basic components that operate with the SOAP module shown in the direct access email system of FIG. 1.

The engine servlet 50 hosts the aggregation engine 90 as shown in FIG. 6. The aggregation engine 90 is a component capable of validating, polling and downloading against a large number of external mail sources concurrently. It receives instructions to do so in batches. To accomplish this it uses Java and a thread to handle all requests in a batch. The Engine Servlet 50 is used for its ability to validate sources. As for polling and downloading those duties are left to the DA Proxy 42.

Referring to FIG. 6, validation is a process that occurs during simple provisioning. When the user enters the email address and password for an account to be integrated, a request is sent to the SOAP component 52 to create the source mailbox. As part of the creation process the SOAP component applies the credentials to a set of rules learned and stored in the database 52 to produce a set of guesses. These guesses are composed of server address, password (as supplied), protocol, and login, similar to the process set forth in commonly assigned U.S. Pat. No. 6,959,325, the disclosure which is hereby incorporated by reference in its entirety. The central database 54 is queried to select an engine 90. The guesses are then batched and sent to the engine servlet 50 for validation. The engine servlet 50 feeds the "guesses" to the aggregation engine 90, which connects and initiates the login process against all the servers according to the guessed protocol. It then waits for the responses. The results of the login are collected and a result is formulated and returned to the SOAP component 52. If the validation result is unsuccessful the user may be directed to a more advanced provisioning screen. Otherwise the source mailbox is created.

The Event Server 46 is a process that acts as a message queue for HTTP notifications from external sources (ISPs and SMC). The messages are processed asynchronously so as not to block the source. The processing of the message involves dispatching to the appropriate service. The event server is also used internally to send out subscription request via SOAP.

Figure 7:
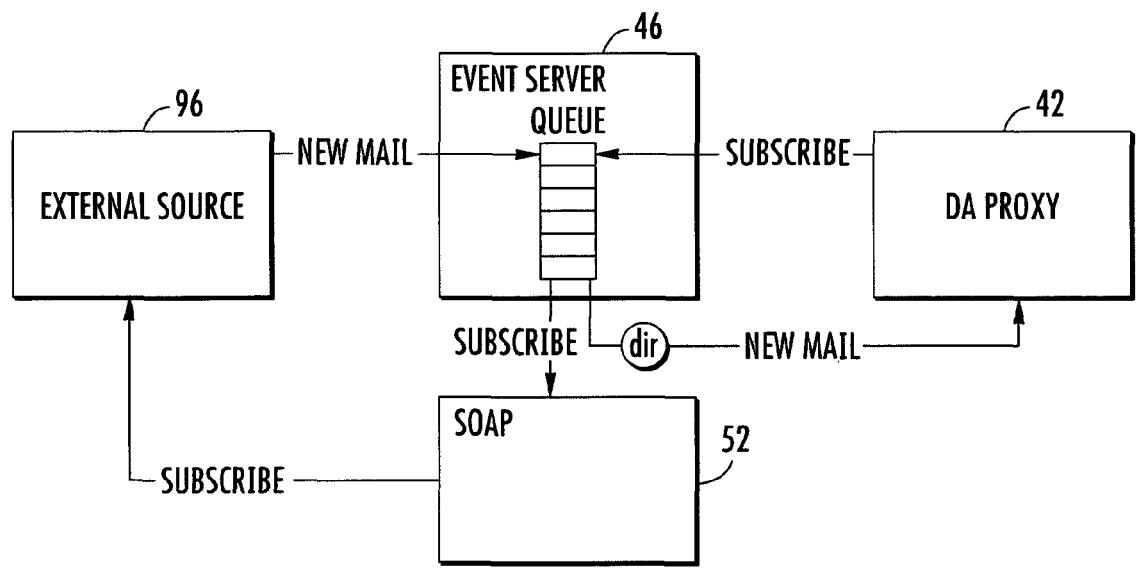
FIG. 7 is a block diagram showing basic components that operate with the Event Server as shown in the direct access system of FIG. 1.

FIG. 7 illustrates a new mail request from an external source 96 being delivered to the DA Proxy 42 and a subscription request from the DA Proxy 42 being delivered to SOAP and onto the external source 96.

The Event Server 46 is accessible from the internet and is accessed via a BigIP pool. To add capacity additional Event Server instances can be added to the BigIP pool. The number of instances required depends on the number of user that have subscribable sources.

When the system is unable to directly access an external mail source (e.g., corporate firewall) the Mail Connector 100 and PWP Server 102 are used together to access the mailbox. The mail connector 100 is a Win32 based application/service that a user installs, as part of the source integration process, within a network where the source can be accessed. It is capable of accessing an exchange mailbox via MAPI and a Lotus Notes mailbox via "Notes API". The PWP Server 102 acts as a rendezvous point between the Universal Proxy (UP) 44 and the Mail Connector 100. The Mail Connector 100 is typically connected to a PWP Server 102 waiting to process requests from UP 44. The PWP Server ensures that the mail connector and UP, for a given source, are talking to the same PWP Server. It is also responsible for distributing sources across PWP Server 102 instances. For sources that require and use the Mail Connector 100 the Universal Proxy 44 sends all HTTP mail requests to the PWP Server 102 along with the PWP GUID identifying the client.

The universal proxy 44 provides access to external mail sources 48 via an enhanced HTTP Mail interface. The UP 44 supports the following mail sources in a non-limiting example:
  a) IMAP with special implementations for AOL/Compuserve, Yahoo;
  b) POP with special implementations for MSN, RPA, Gmail;
  c) Mail Connector for access to Domino and Exchange;
  d) Hotmail; and
  e) Outlook web access.

Access to a mail source is demarcated with an HTTP Session. All information required to access the mail source is provided from the initial request of the Session. In order to translate the HTTP Mail request to the appropriate protocol there exist a set of objects called connectors. There is one connector for each type of mail source.

The DA proxy 42 is the conduit for sending and receiving emails between the engine 22 and the integrated mail sources 48. Additionally, the DA proxy is responsible for detecting new mail from external mail sources and pushing to the engine 22. Three mechanisms of detection are used for polling, subscription to mailbox for notifications, and permanent connections to sources.

It also provides the engine with access to User data. It processes MPH messages for integrated sources (new mail, reply, forward, delete). It also pushes service books to the engine.

The DA Proxy 42 provides an asynchronous HTTP interface. All client requests are immediately queued and responded to with an HTTP Response of 200. When applicable the request specifies an HTTP address where the "response" is to be sent in another HTTP request. When duplicate request are sent by the same component they are dropped. Different requests can be handled asynchronously by the DA proxy 42. These include:
  a) User information retrieval (Engine 22);
  b) Message retrieval from an integrated source (Engine 22);
  c) New mail notification from subscribed source (Event Server 46);
  d) Send service books, PIN Messages and PIN Change (SOAP); and
  e) Source Assignment (SAM) 60.

Figure 8:
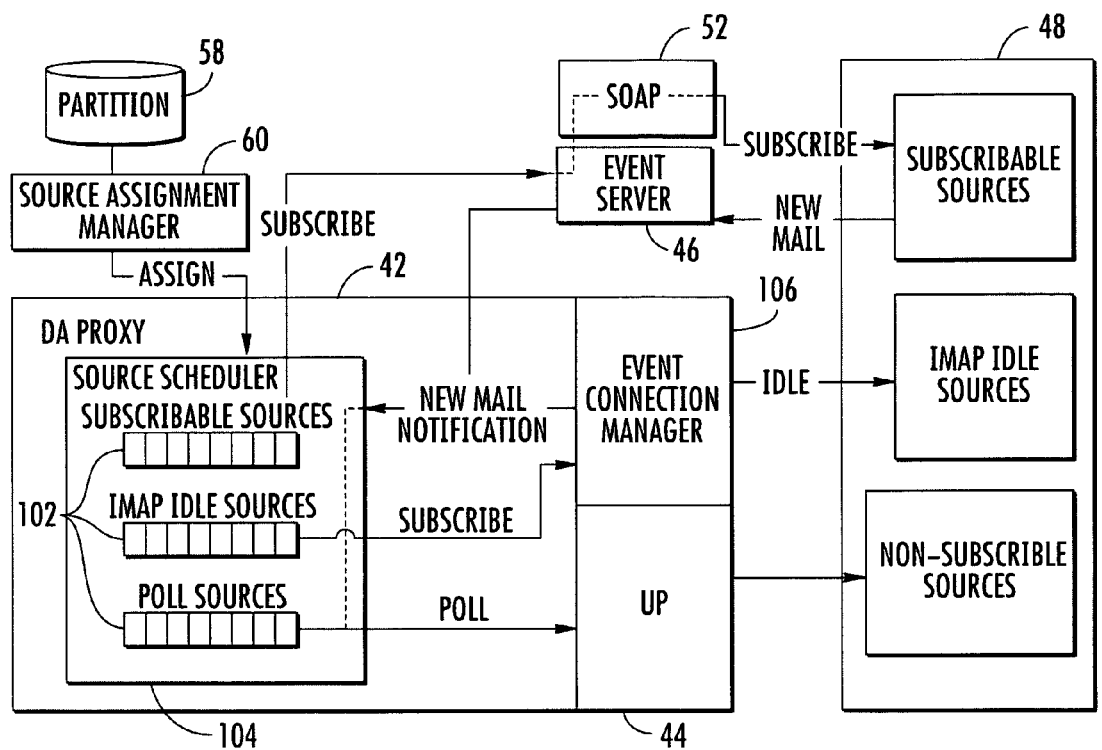
FIG. 8 is a block diagram showing components that interoperate with the Direct Access Proxy shown in the direct access email system of FIG. 1.

The DA proxy 42 is responsible for actively detecting changes to the sources assigned to it by the Source Assignment Manager 60. The DA proxy maintains a set of sources 102 that it schedules for servicing. Every source has some level of polling. Less polling is done for those sources that support subscribing or a connection based notification. FIG. 8 illustrates at a high level the components of mail detection, including a source scheduler 104 for scheduling different sources 102, and also an event manager 106 as part of the DA proxy 42 and the IMAP-Idle sources.

Polling of sources is scheduled at even intervals (usually 15 minutes). Sometimes a source poll is expedited if heuristics determines that it is likely to find new mail. There are three types of polls. The IgnoreOldPoll works as a poll that retrieves all messages IDs from the source and writes them to the Partition database 58. The purpose of this is to prevent the detection of new mail at certain logical points, such as newly integrated source or the user has been unsuspended.

The full poll retrieves all message ids from a source mailbox to do a full reconciliation against all message ids (UIDs) that previous polls have found. For each new UID found, the message is retrieved and sent to the Engine 22 for delivery to the device 38. For UIDs not found (deleted) the UID is removed from the database. New UIDs are also written to the database. The DA proxy 42 executes a full poll on a source when its been more than the value stored in database since the last full poll, or when a quick poll has been disabled for this source.

The Quick poll retrieves only a "page" of source message IDs at a time. It stops once it finds a UID it has already seen. At this point it assumes it has found all new messages. The new messages are then retrieved and sent to the Engine 22 for delivery to the device. New UIDs are now written to the database.

For source types that support a notification mechanism via a subscription (e.g., Yahoo, Google), the proxy 42 periodically checks that those sources are subscribed accordingly. If a source is in a state that it should be subscribed, a subscription request is sent, otherwise nothing is done.

Some source types (IMAP IDLE) support a notification mechanism via a permanent connection to the source. The proxy is responsible for making sure that these connections are created, managed and destroyed as appropriate.

The DA proxy 42 communicates with the worker 24 over an HTTP interface. The worker responds to the request with a delayed ACK as to the success of the request (e.g. successfully accepted). When new mail is detected, the DA proxy pushes one mail at a time and waits for the ACK. Since the ACK may take some time, the polling thread is not blocked waiting for the ACK. If a message is NACK'd the DA proxy will stop pushing the new mail that was found and only write the successfully pushed mail UIDs to the database. For retry purposes the DA proxy will ensure that a poll for the source is scheduled in a reasonable amount of time (e.g., within 15 minutes).

The DA proxy 42 does not require access to the internet, although it accesses the Partition database 58, SOAP 52, Event Server 46, Directory 56, Worker 24, and its configured UP 44 (usually localhost). The DA proxy handles a fixed number of users for a particular partition. The number of users a DA proxy can handle is calculated by measuring its performance. The more users assigned to a partition the more DA proxies, the system will deploy. The load is distributed evenly betweens DA proxies via the Directory components.

A Resource Deployment Server 64 (RDS) allows brand and language specific resources to be dynamically deployed. The resources are typically composed of, but not limited to, Java Resource Bundles, XSLT files, and Images. Any file can be deployed via the RDS as long as the location specified on the target system is well known e.g. (template directory, web-inf/classes etc.).

A resource deployment package is a jar containing one or more resource jars and a descriptor file that describes each resource jar and how it is to be deployed. In essence, it describes what well know directory a resource jar should be expanded to and what version of the resources the jar represents.

A Desktop Manager is an application that provides a user interface for email account configuration. The Desktop client provided by the system "plugs" into the Desktop Manager and provides specific UI for configuration of integrated sources. A Management API provides a SOAP interface for the creation of accounts and for integration of email sources. A Desktop manager provides a user interface for integrating and managing email accounts. Both simple and advanced provisioning will be provided.

Any Java handheld apps can use TCP (HTTP) as their transport. This allows use of existing device APIs that provide and manage all aspects of TCP (HTTP) traffic to and from the device. Inside the HTTP wrapper will be an XML data component.

There are also aspects of SMTP used with the system. Mail providers desire outbound mail for their users to go through their SMTP servers 49. The system as described wants to use the ISP's mail servers to avoid problems such as "marked-as-spam." The system can use part uses its own internal SMTP server 77 for outbound mail currently. The end users may not always know or remember their SMTP servers when they are configuring their integrated mailbox. The system configuration allows for the specification of a SMTP server 49 given a mail-access-server, protocol combination. Once a mailbox is integrated, if the integration matches a given (server, protocol) combination, it is possible to use the SMTP server 49 specified in the configuration. The system can potentially use other parameters in the future. For mail providers that can specify an SMTP server, the system can automatically use their SMTP servers 49 for their users. The users do not have to go through additional steps to configure their SMTP servers. This implementation will automatically work for hosted domain mailboxes as they use typically a specific mail access server of the mail provider. It is possible to implement an automatic guessing of SMTP servers where the system will attempt to send an email to a known server address through a "guessed" SMTP server using the mail access credentials.

The system would have automatically configured the SMTP server 49 even when the system does not have a pre-existing configuration. Guessing logic may include the user of users' mail access server or mix-server of their email ID's mail domain (DNS). It is possible to extend the solution to allow users to specify their SMTP servers 49. If the server-domain of the SMTP server matches the server-domain of the mail access server, the system will "learn" this information and attempt to use this for other users who also use the mail access server.

For mail providers that can specify an SMTP server 49, the system will automatically use their SMTP server for their users. The users do not have to go through additional steps to configure their SMTP servers. This implementation will automatically work for hosted domain mailboxes as they too use a specific mail access server of the mail provider. The system can also implement automatic guessing of SMTP servers when the system attempts to send an email to a known address through a "guessed" SMTP server using the mail access credentials. If it works, the system automatically configures the SMTP server even when the system does not have a pre-existing configuration. Guessing logic may include the use of users' mail access server or max server of their email ID's mail domain (DNS).

There are differences with the prior art using the system as described. A version of Outlook Express (windows live mail desktop), automatically configures a POP/SMTP server for a given email address for popular ISP's. WLMD (Windows Live Mail Desktop) automatically configures based on a user's email address. A KnowledgeBase for popular ISP's is downloaded from servers and used when the user's email address matches one found in the KnowledgeBase.

The system gives integrated source server protocol and an external SMTP protocol sends email. The system configures the SMTP server 49. The user sends mail and looks up the SMTP server user's external send mail. The system uses its own internal SMTP servers for sending email, allowing the system to pre-configure an external SMTP server 49 for sending email. The configuration is done beforehand with a mail server provider, and once any system is configured into send mail, a device user sends mail to external server and the device looks to an external SMTP server for necessary information. Unlike Outlook Express, given that this is mail access protocol, it tries to figure out which server to use. Windows desktop mail, e.g., for Comcast, has a list of popular SMTP server (popular ISP's are in list). The system can implement guest servers and use automatic guessing logic.

ISP SMTP Support can be added for a configurable set of ISPs. ISP SMTP Support can support authorization based on srcmbox.login and srcmbox.password. ISP SMTP Support can support connections over SSL when configured.

Figure 9:
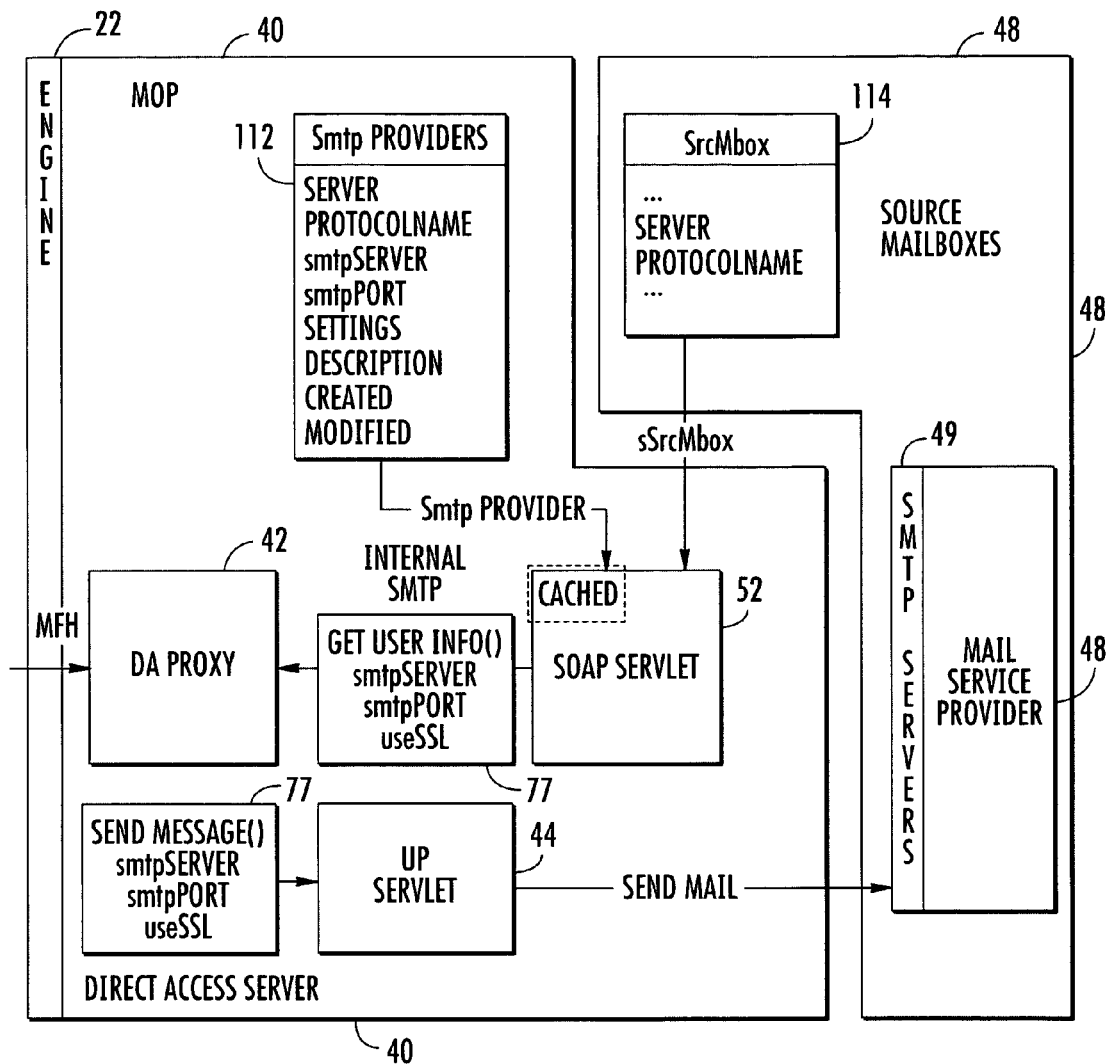
FIG. 9 is a block diagram showing basic components that operate with the Direct Access Proxy for SMTP support.

FIG. 9 illustrates basic aspects of the components as described. The DA Proxy 42 is illustrated and operable with the UP Proxy 44 as a servlet and SOAP component 52 as a Soapservlet, including a cache. The mail service provider 48 is illustrated and operable with the UP proxy 44. A database table 112 as part of the server and mobile office platform 40 is entitled SmtpProviders with data sent to the cache of the SOAP 52. The sourcemailbox 114 is operable with the SOAP 52 to communicate regarding the server and protocol.

There can be a new database table and stored procedure in Central database, Soap Servlet, DA Proxy, UPServlet. The table 112 is added to allow the configuration/specification of ISP STMP servers, known as SmtpProvider. The SmtpProvider table 112 will be used to store SMTP server information for a srcMbox's 114 server/protocolName. If a server/protocolName for a srcMbox is not specified in this table, internal SMTP servers will be used to send mail.

As shown in FIG. 9, the database will include a SmtpProvider table 112 and data relating to the server such as the srcMbox mail service hostname or IP address; the protocolName such as the srcMbox protocol used by the specified server settings, including as a non-limiting example:

bit 0: use SSL
0=do not use SSL;
1=use SLL
bits 1-15: unused.

Other information in the table is related to the smtpServer as SMPT server hostname and smtpPort as for example, SMTP port (default=25). Other data will be related to settings, description, and created and modified data items. There will be stored procedures, such as sSmtpProviderMapping that is used by the SOAP Servlet to select all rows from the smtpProvider table.

The system will modify the SendMessageHandler to include the smtpServer, smtpPort, and use SSL boolean in sendmail requests that are sent to the UP Servlet 52. The system will modify the SOAP Servlet 52 to include smtpserver, smtpPort, and use SSL boolean in a UserInfo response.

The SoapServlet 52 will cache the SMTP Provider data into a single object. A servletManager command can be added ("clearSMTPProvCache") to allow dynamic refreshing of this cache without requiring a Soap Servlet restart. The data can be stored in a Map and typically there should be no more than several hundreds of entries in this table.

The system supports auto-configuration of integrated mailbox given a user's email address. This is done using the mail domain of the email address and matching it against the system knowledge-base. The system builds this knowledge-base based on guessing (on mail domain) and learning from prior integrations. For mail providers that support hosted domains, there are several hosted domains, each used by a small set of users. Further, the mail domain of the user may not match the mail domain of the mail access server. For example, email ID could be murthy@gortyfamily.net and the email access server could be server.register.com).

The system will not work for the majority of the hosted domain users as the audience set is a larger number of domains each with small number of users as opposed to large number of users for a smaller number of domains. Adding a configuration entry into the knowledge base will also be cumbersome as the number of entries would explode.

The system simplifies integration of hosted mail domains. The system maintains a knowledge-base of MX records from the DNS and matches against the knowledge-base to retrieve the mail access configuration for that mailbox.

This enables the system to automatically configure an integrated mailbox for all hosted domains of an ISP regardless of whether another user from a specified hosted domain has integrated his mailbox. This also enables the knowledge base to only contain one entry for all hosted domains of a mail provider, vastly simplifying the knowledge-base. The system can potentially use a similar solution for retrieval of SMTP servers as well (outbound SMTP vs. inbound mail access configuration), thus, extending the solution to configure other services, not just mail access. In the future, the system can implement guessing based on MX record patterns if there are no matches in the knowledge-base. The system can also auto learn into the knowledge-base, thus, expanding the knowledge-base. In the future, the system can also expand the lookups to other aspects of the DNS (or some other service), and retrieves the IP address from DNS, PTR lookup to see if it goes to a different domain and use a server within that domain.

A mail exchange (MX) record can be an entry in a domain name database that identifies a mail server that is responsible for handling electronic mail for the domain name. Different MX records can be entered for any single domain name that is using more than one mail server. Priority can be obtained by a preference number, indicating the order in which the mail servers could be used. This would allow primary and back-up mail servers. Thus, an MX record maps a domain name to a list of mail exchange servers for that domain.

Another type of mapping from a name to an IP address is an address (A) record, for example, the host name to an IP address mapping. Typically, in the priority of MX records, the smallest preference number has the highest priority.

It should be understood that although the DNS system supports different types of record systems, the A record is typically a straight mapping between a name and one or more IP addresses. The Mx record is usually used for routing email traffic, for example, routing emails of a particular domain name to a particular server that can be different from what is in the A records. Typically, the MX record is a good indicator for where the email domain name server is routing mail and can be used not only to check a user domain name against the MX record to see if a match occurs, but also to improve the guessing logic as will be explained below. If the MX record does not match, there could be a failure and the system may not try to authenticate, but would ask a user to re-enter the particular email address parameters. The system and method could take a portion after the "@" and do a DNS query on the internet for MX and A records. A number of MX records can be pulled and the best one is picked to accomplish the provisioning and determine which server to pull mail from, especially when a company has several servers with different MX records acting as back-ups. This is important for vanity domain names. If there is an A record, there may or may not be additional insight on provisioning, yet in some instances, the A record can be used for determining a valid address. It is also possible to make several educated guesses as explained below. Otherwise, the user is told it is not a valid address.

IMAP-Idle improvements occur. IMAP-Idle is described in REC 2177, which is incorporated by reference in its entirety. There are advantages for the IMAP-Idle connection limits on a per user basis and per server basis and advantages for same. There are two problems this improvement in IMAP-Idle solution addresses.

First, a single host such as AOL may have X amount of users and allow Y amount of simultaneous TCP connection (where X>Y). If all X AOL users support IMAP-Idle, connection attempts will be made for all X users even though only Y connections are supported. If unaddressed, other hosts would be unable to make other TCP connections to the host.

Second, a single user's IMAP email account may only support one simultaneous TCP connection. If a second connection is used to retrieve user data from the same account, the first connection or second connection may be disconnected with or without warning. Assuming this went unaccounted for, mail integration would fail indefinitely.

An IMAP-Idle Java connection manager is implemented in the system. Because there are so many varying TCP connection limits from domain to domain, it is not desirable to set a hard coded outbound TCP connection limit to these domains. Instead, an IMAP-Idle connection manager is introduced to manage IMAP-Idle connection failures. If an IMAP-Idle connection fails a failure streak, management by the IMAP-Idle manager is increased by one until it reaches a limit. If the limit is reached or exceeded the source is marked IMAP-Idle "disabled" and the source will not be connected in order to establish an IMAP-Idle connection. Therefore, if domain A has a set limit D and the system successfully connects D time, all subsequent IMAP-Idle and poll connection attempts will fail. By marking sources invalid for this type of connection, it ensures all sources have access to this domain. If the IMAP-Idle connection was dropped, the system determines if it dropped while an email poll (secondary connection) was in progress. If so, the account is marked IMAP-Idle "disabled"

and the account will not be subscribed to in the future, thus, preserving resources and improving the user's email delivery experience.

The IMAP-Idle definition states that the IMAP server displays the term IDLE when the server is asked what capabilities it supports. If the server claims to support IMAP-Idle, but fails to enter the IDLE state, the system continuously attempts to establish IMAP-Idle connections when one is not possible. An IMAP-Idle manager is implemented which checks the result of attempting to establish an IMAP-Idle connection. If the connection fails X times in a row, the IMAP-Idle feature will be disabled so the system can stop attempting to connect to an unsupported or incorrectly configured service.

These are instances when the email server reports IMAP IDLE capabilities but fails to actually enter the IDLE state. In this case the IMAP IDLE manager will track the number of attempts to establish an IMAP IDLE connection to that server and if the failure exceeds a pre-specified threshold, then the system can stop attempting to connect to an unsupported service.

The system polling environment can attempt to poll the account at an intelligent interval hoping to find new mail messages. If new mail is available, it is downloaded and sent to the user via their device. If this account is subscribable (IMAP-Idle supported) the system can reduce the amount of connections and connection attempts to the host, which do not accept high connection rates. The system can minimize the amount of data sent over the internet and produces a fast email delivery system.

The IMAP-Idle connection can monitor the account for changes that occur and immediately download new information when an event occurs. This allows the system to skip (unneeded) empty polls for a source that has not received any new mail. Skipping the polls saves data transfer, any unnecessary TCP connection, connection attempts and also real time email delivery. This implementation is centralized and is represented as a subscription as opposed to PALM and MS systems, which are device and application based.

IMAP IDLE is an optional expansion of the IMAP email accessing protocol that allows the server to send new message updates to the client in real time. Instead of having the system email program check for new mail every few minutes, the IMAP IDLE allows the server to notify the email program when new messages have arrived. The system can see incoming mail immediately The use of IMAP IDLE is known. However, the difference from PALM is that the system implements this on the system as with the DA proxy 42 not on the device.

The IMAP servers are set up to allow 30-minute TCP connection before they may disconnect them according to the IMAP RFC. If the system is to maintain an IMAP-Idle connection indefinitely, it should find a method to avoid this without missing new mail events produced by the IMAP-Idle connection in the meantime. Because several internet domains are known to disconnect TCP connections earlier than 30 minutes, the system resubscribes every x minutes, where X is configurable. To resubscribe the system quickly, it issues an IMAP "fetch" to check if new mail was received before re-entering the IDLE (subscribed state). This ensures the connection is kept alive and new email events are not lost.

In accordance with non-limiting examples, IMAP protocol is updated with a new command IDLE, using which clients go into an 'idle' mode. In this mode, an IMAP server sends mailbox changes as untagged responses to the 'idle' client, such as when new messages are added or when they are deleted. Clients come out of this 'idle' mode by issuing a DONE.

The MOP 40 as a Direct Access server currently supports a subscription/notification model or real-time mail delivery. In this model, a mailbox-provider notifies the MOP when new mail arrives at a mailbox. There is no persistent connection between the MOP 40 and mail-provider.

By supporting IMAP IDLE, the MOP 40 can make it easy for the mail-providers to support real-time mail delivery. To support IMAP IDLE, the MOP would need to maintain a persistent connection to the mail-provider. The connections used in this IMAP-Idle implementation will be used solely to detect new mail and notify that the related source is ready to be polled. All previous MTH and MFH jobs remain as work completed by the DA proxy work queue and its UP servlet. The system supports real-time notifications for all IMAP sources that support IDLE capability.

External subscriptions are persistent subscriptions made with external mail providers such as Yahoo and Gmail. Idle login failures occur when after an invalid login attempt is received trying to initialize an IMAP-Idle connection. Receiving this failure will increment the existing login failure streak to one.

An idle subscription failure streak will include all connection and command related errors while attempting to establish an idling state for a particular IMAP source. Typically, login failures are not included in the count.

Figure 10:
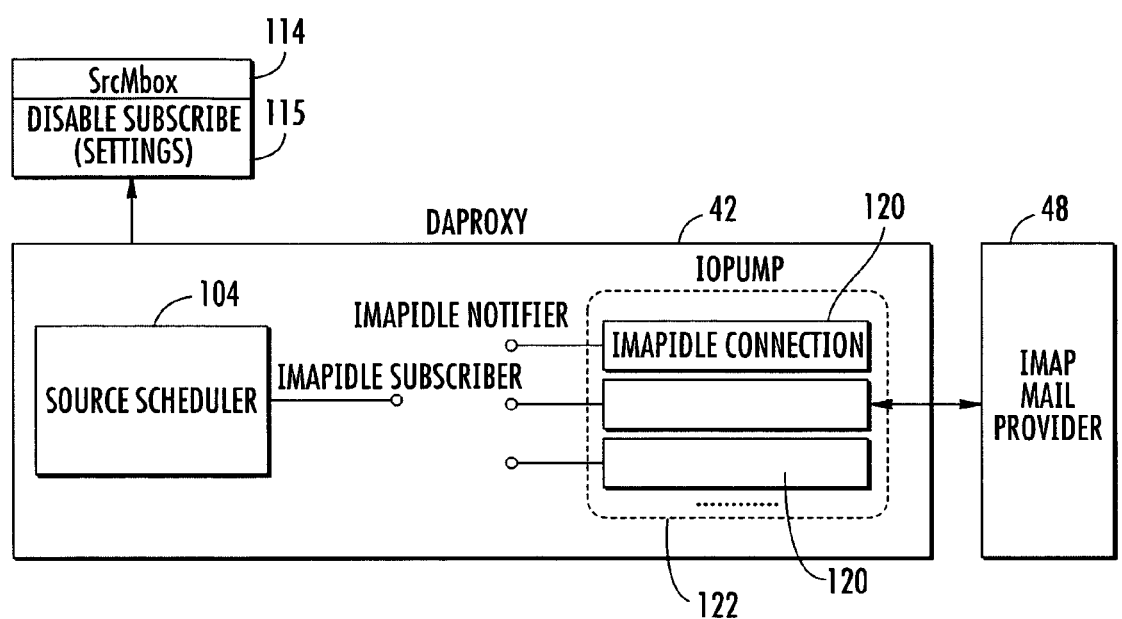
FIG. 10 is a block diagram showing basic components of the Direct Access Proxy with the IMAP Mail Provider.

To support IMAP IDLE, the system will maintain a separate ImapIdleConnection 120 for each user in the DA Proxy 42 as shown in FIG. 10.

The ImapIdleConnection 120 discovers the presence of new mail and this triggers the normal polling mechanism that goes through UPServlet, which will continue to be used for polling and all MFH operations. Creating ImapIdleConnections 120 in the DA Proxy helps the polling system in the DA Proxy keep track of these connections for each source. An IOPump 122 serves as the connection manager for all ImapIdleConnections 120.

Unlike external subscriptions that are persisted in the database IMAP-Idle subscriptions are considered transient and are only in the memory of DA Proxy.

The Source Scheduler 104 and DA Proxy keep track of IMAP IDLE subscriptions. Unlike external subscriptions which are persisted in the SrcMbox table with a subscriptionId, these subscriptions are in memory. Once a poll is successful, the Source Scheduler 104 determines if a source capable of IMAP-IDLE is not yet subscribed. The Source Scheduler 104 creates an ImapIdleConnection for this source mailbox 114 and initiates the subscription process. Sources that are marked with 'disableSubscribe' 115 will not be subscribed.

Figure 11:
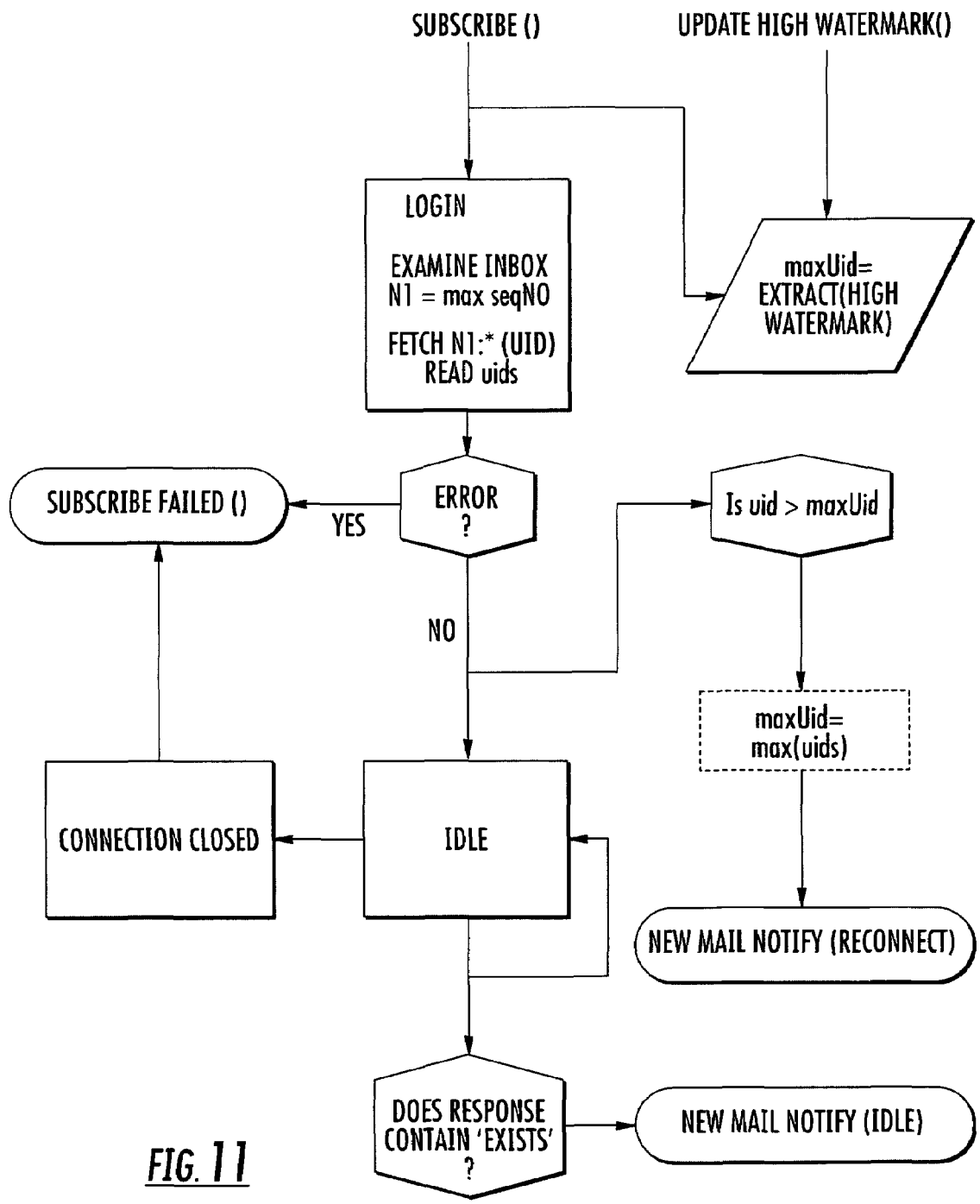
FIG. 11 is a flowchart showing functional steps for the IMAP idle connection.

After each poll, the Source Scheduler 104 updates the subscription in an ImapIdleConnection. Updates to a highWaterMark as shown in the flowchart of FIG. 11 allows the ImapIdleConnection to appropriately discover new messages when an 'idle' connection closes. Additionally, this will allow an ImapIdleConnection to pick up any changes to the source-mailbox such as updates to the source mailbox data such as the server/user/password.

FIG. 11 illustrates a login, determination, and IDLE to show the IMAP-Idle connection in discovering new emails.

An optimization can be made for IMAP-IDLE sources to immediately change the nextPoll to after 6 hours. For external subscriptions, the system can change the nextPoll only after the next poll to catch any new mails between last poll and a successful subscribe request. The ImapIdleConnection can discover any new mail since the last poll. As a result, this optimization can be made.

If the Source Scheduler 104 discovers that a source should not be polled any longer, it notifies any existing ImapIdle-Connection 120 to stop further notifications and cleans up the ImapIdleConnection.

The Source Scheduler 104 is notified when the ImapIdle-Connection 120 discovers new mail in the mailbox. The Source Scheduler schedules a poll upon such notification. If the ImapIdleConnection 120 cannot go into idle mode, it notifies the Source Scheduler that the subscription had failed. Some of the failures are Idle login failures and the remaining are Idle subscriptions failures.

As shown in the flowchart of FIG. 11, to utilize the IMAP-Idle connection 120 the Source Scheduler 104 must first determine if the TMAP source is subscribable. To determine this, the DA Proxy makes a callback to the Source Scheduler once a poll for this source completes. The callback lists new properties such as the high water mark and subscribability.

If the source happens to be subscribable the source scheduler will create a new subscription job and add it to the DA Proxy processing queue. These jobs are handled by the subscribe and unsubscribe handlers.

The handlers' first task is determining which resource to use to complete its job. For ImapIdleConnection the Source Scheduler is that resource. The handler makes a call into Source Scheduler to subscribe to this specific source and is provided a response code for the success or failure of that process as shown in FIG. 11.

A callback is made on completion of the subscription job. If the subscription was successful the subscribable flag will be cleared and the source will be marked as a subscribed.

Figure 12:
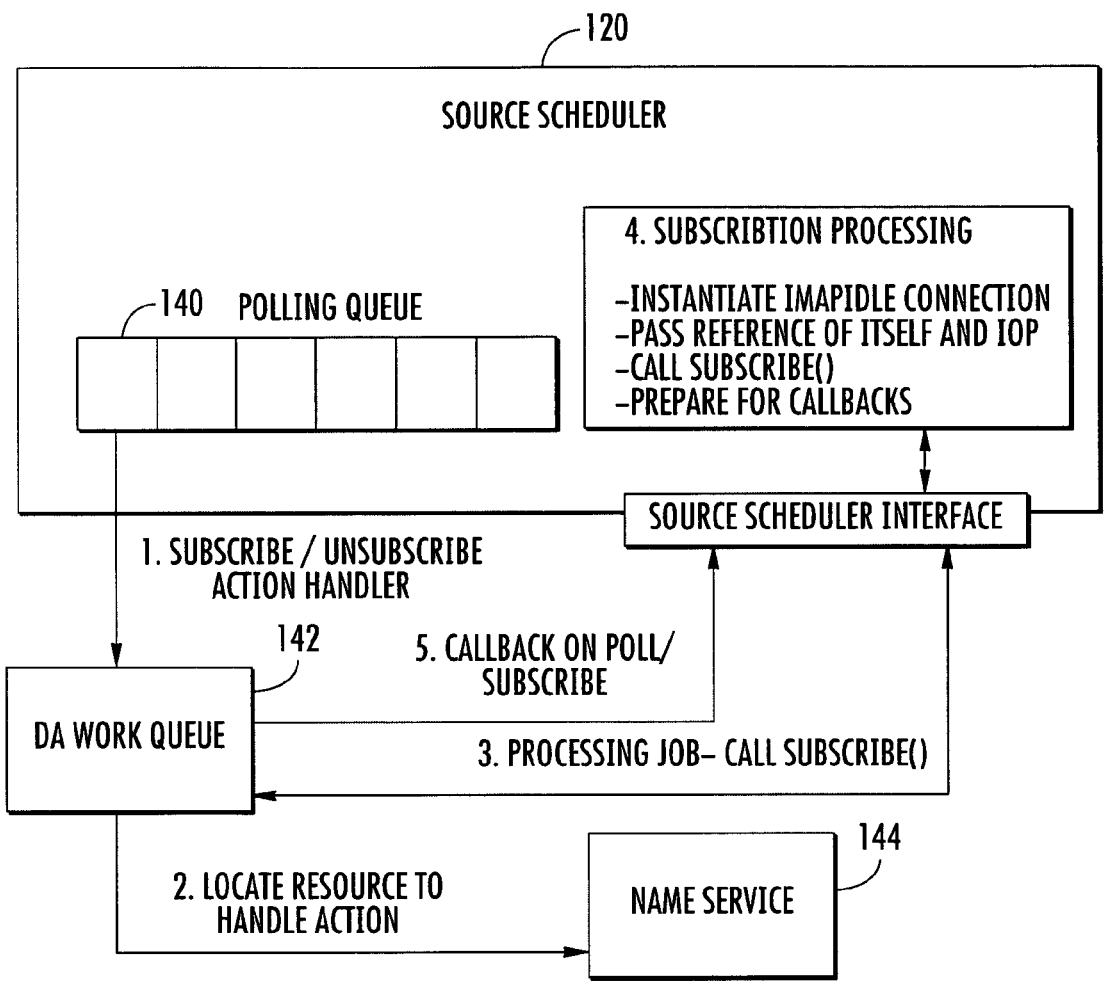
FIG. 12 is a block diagram showing basic components of the Source Scheduler and interoperation among components.

FIG. 12 is a diagram showing the source scheduler 110 and polling queue 140 when a source has already been marked subscribable by the previous callback from the poll into the Source Scheduler. The polling queue 140, DA proxy work queue 142 and name server 144 are illustrated and work together as shown.

If an ImapIdleConnection 120 encounters a connection error or an error in issuing commands, it notifies the Source Scheduler 104 that the subscription had failed by returning an idle subscription failure. The Source Scheduler keeps track of the error and pulls in the next poll for that source to within 15 minutes from the last poll. If the failureStreak for this error exceeds a configurable limit, this source will be marked with 'disableSubscribe' settings bit.

If the ImapIdleConnection discovers a login failure, it returns an idle login failure to the Source Scheduler. The Source Scheduler bumps up the existing login failure streak on the source. Any source with a failureStreak>0, will not be subscribable. Login failures will not result in persistent 'disableSubscribe' bit.

Figure 13:
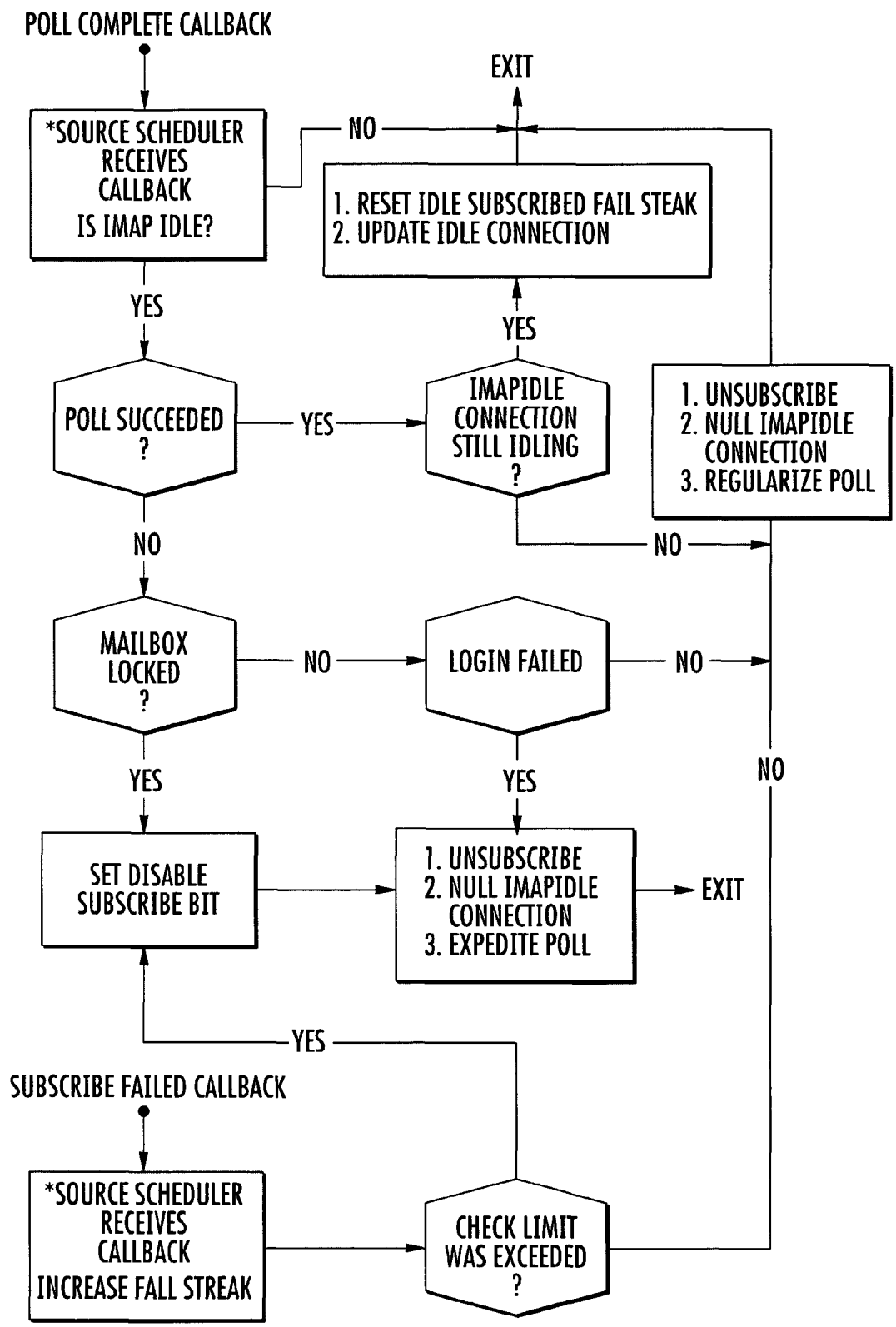
FIG. 13 is a flowchart showing basic steps for the IMAP idle support.
Figure 14:
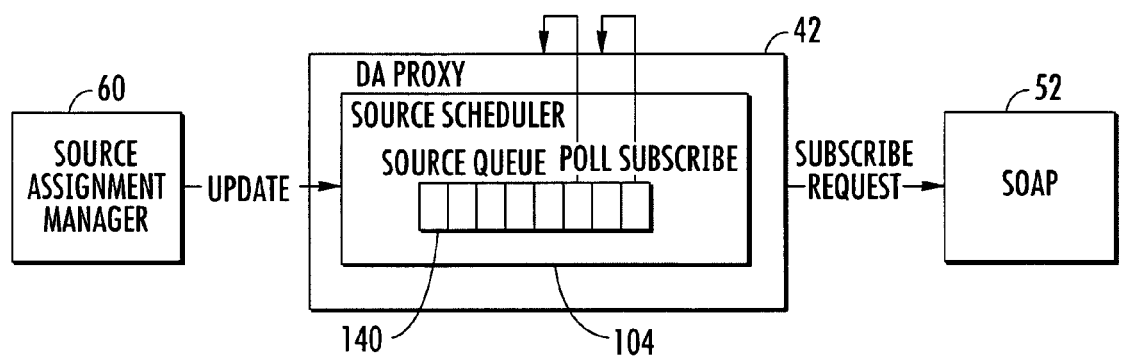
FIG. 14 is a block diagram showing basic components of a Source Scheduler for the Direct Access Proxy.

Some implementations of IMAP protocol exhibit a race condition. If a mailbox receives a new mail after the client goes into select state and before an idle command is issued, the system will return an untagged 'exists' response indicating the presence of new mail. FIG. 13 illustrates a flowchart of the method.

The system mitigates this by immediately issuing an 'idle' command after the system receives a response for a 'fetch' command. The system parses the 'fetch' response asynchronously after the 'idle' command is issued. The race condition is not avoided completely, but is reduced to a very short interval, hopefully less than a second.

This problem is further mitigated by the mechanism originally designed to reset IMAP timeout timers. To reset the timeout timer the ImapIdleConnection object will issue a 'DONE', to leave the IMAP-idling state, followed by a 'FETCH' to reset the timer and check for new mail received. If mail was missed during the previous race condition or due to a faulty idle implementation it will be caught here. This will be executed every 5 minutes but will be configurable.

The Source Scheduler keeps track of new mail discovered on re-connects. If it successively discovers new mail only on re-connect and reaches a configurable limit (default is 0-infinity), it calls back on Source Scheduler (itself), disabling the subscription, additionally marking the source 'disableSubscription'. On new mail notifications, ImapIdleConnection informs Source Scheduler whether the discovery is from a re-connect (poll) or idle notification.

By setting the default to infinity the existing connection provides a lighter polling alternative and is therefore still acceptable.

If the Source Scheduler discovers new mail during fallback polls, it keeps track of streaks of 'newMailOnFallback'. If this reaches a configurable maximum, this IMAP-Idle source will be marked with 'disableSubscribe' which is persisted in the database. For external subscriptions, they will be unsubscribed and re-subscribed on a next poll. The default value for this limit is 3.

Additionally, to improve user experience, the Source Scheduler will change the next-poll to the default 15 minutes when new mail is discovered on a fall back poll. For external subscriptions, they will be unsubscribed and re-subscribed on next poll. The system can thus address when the subscriptions become out of sync.

If a mail-provider restricts the number of connections allowed, the system will discover these limitations as normal connection-failures resulting in marking the mailbox as a 'disableSubscribe.' This is also true for AOL.

Similar to POP, IMAP servers can also return 'mailbox locked' errors. If ImapIdleConnection returns a 'mailbox locked' error, the source is immediately unsubscribed and marked with 'disableSubscribe'. On the other hand, if 'mailbox locked' is returned as error during normal polls, the Source Scheduler recognizes this and if there is an existing ImapIdleConnection for the source, unsubscribes it and marks the source with 'disableSubscribe.'

If an IMAP-Idle connection is disconnected while the source scheduler is processing a new mail notification the scheduler will increment the IMAP subscribe failure streak and continue with the next source. Assuming the poll succeeded the source will be marked as subscribe-able or un-subscribe-able by the polling mechanism. If the poll was unsuccessful the source scheduler will continue to poll this source every 15 minutes.

If a poll connection fails while an IMAP-Idle connection exists the scheduler will unsubscribe the source, increase the fail-streak and expedite the poll. By providing a mechanism to reset the failure streaks the system will not run into a long-term problem and find all sources 'disableSubscribe.'

The system can avoid IMAP-Idle race-condition by using another connection to check for new mails after the IMAP-Idle connections goes into an idle mode. This can also be by triggering additional poll every time we enter idle mode. Some servers may close the servers far more often and the system does not necessarily want to poll on every connection closure. The system enters an idle mode on every connection closure. The system can issue 'fetch' and 'idle' commands simultaneously, reducing the race-condition even further.

IMAP-Idle monitoring is used to monitor the health of the feature. The following fields will allow a manager to determine if a particular source scheduler is able to subscribe to IMAP sources and how the amount of subscriptions fluctuate (errors received) during polling intervals. Different fields can be monitored such as:
number of idle connections (cumulative);
time to subscribe (cumulative);
number of subscription requests (cumulative);
new mail notification—idle (cumulative);
new mail notification—re-connect (cumulative);
login failures (cumulative);
mailbox locked (cumulative);
connections lost (cumulative);
IMAP commands failed (cumulative);
idle state lost (cumulative);
poll failed (cumulative); and
how many disableSubscribe bit were set (cumulative).

There now follows greater details concerning polling and details regarding out-of-coverage notifications to preserve polling resources in the DA Proxy.

Figure 15:
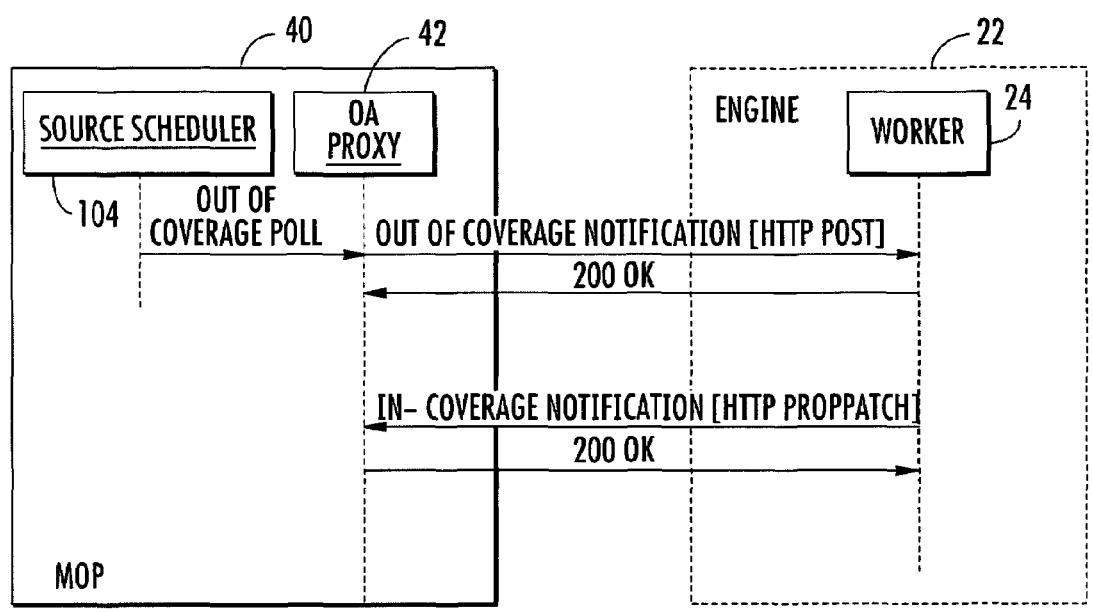
FIG. 15 is a sequence diagram showing transactions between the Mobile Office Platform and the worker for the out of coverage notification.
Figure 16:
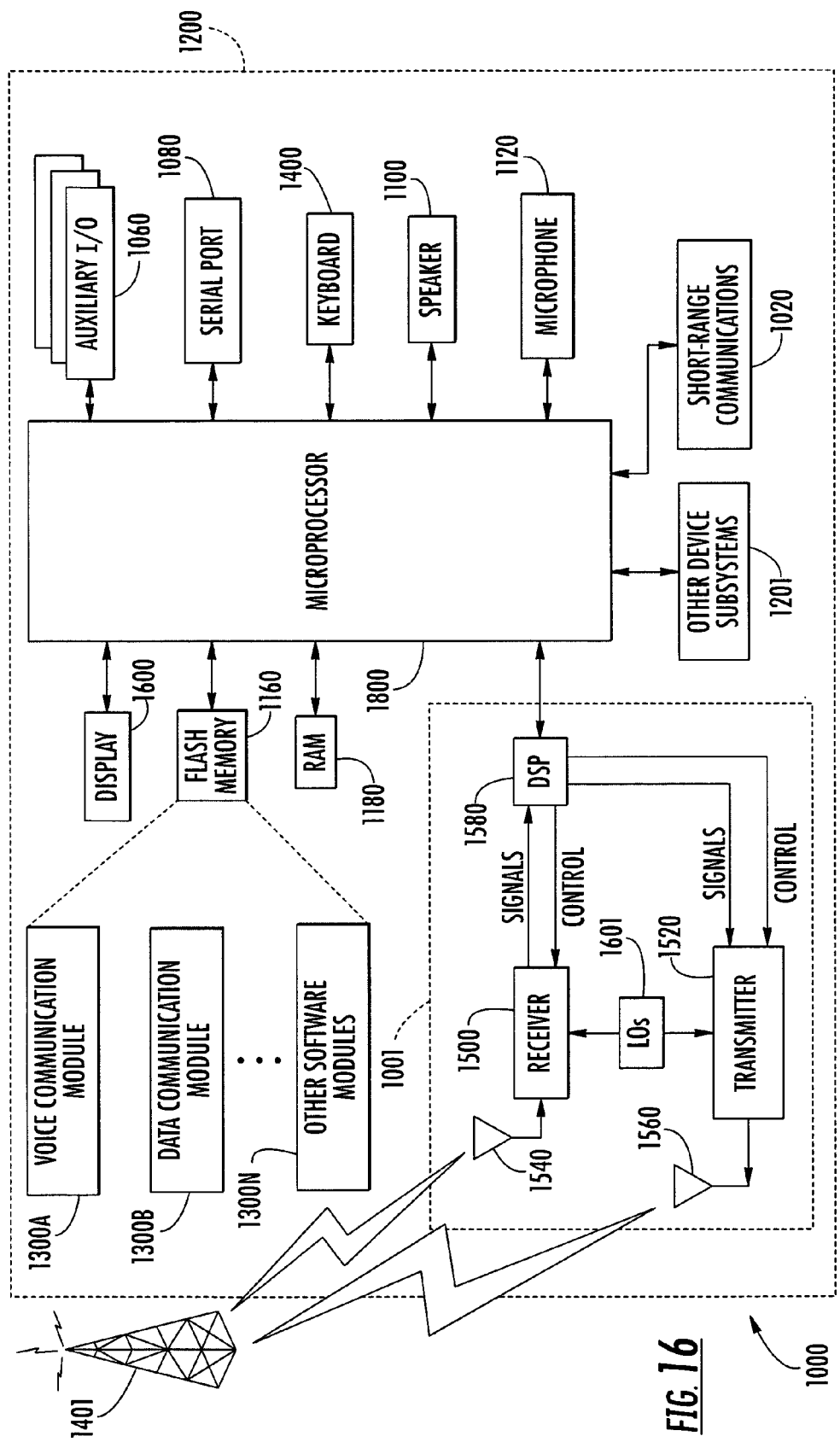
FIG. 16 is a schematic block diagram illustrating an exemplary mobile wireless communications device that can be used with the Direct Access email system shown in FIG. 1.

The MOP 40 and workers 24, as shown in FIG. 15 and explained in greater detail below, interact to suspend polling of email sources based upon user devices being out of a coverage are or turned off. This allows unnecessary polling to be avoided when a user cannot otherwise receive his or her email. However, problems arise in designating a subscriber as out of coverage in that in/out of coverage notifications to the workers 24 may not arrive in order. Moreover, there is a possibility that such notifications can be lost, such as when there is a worker failure event. A special "fail-safe" polling operation for out-of-coverage sources allows the workers to correct the MOP status if a "race condition" or error condition occurs that was not otherwise detected.

It should be understood that there are constantly sources that are attributed to an account whose handheld device is out-of-coverage (or turned off). Currently, these sources are still polled for new mail even when they are out of coverage. This polling is not useful since mail cannot be delivered to the device when it is out-of-range. Hence the polling unnecessarily consumes bandwidth and uses system resources.

In accordance with non-limiting examples, the source scheduler 104 receives a relay pushback request via the DA Proxy 42 for each device 38 that is out-of-coverage. The purpose of handling relay pushback requests in the MOP is to:

1) save bandwidth and not poll sources that are out of coverage;
2) resume polling sources when a user comes back into coverage; and
3) reduce the number of messages that have to be cached on disk in the workers.

A device 38 going in and out of coverage (this might happen if someone is near a weak signal) results in the relay making pushback requests relatively frequently to the worker. There is no assurance that these requests will never become out-of-order along the way to the worker 24. Furthermore, the asynchronous nature of the web client engine 22, MOP 40 and relay protocols within the relay 34 make for an endless number of sequences and magnifies the possibility of a race condition between out-of-coverage notifications and in-coverage notifications. The worker 24 needs to either keep notifications in sync or detect and disregard any out-of-sync notifications.

There is also the issue of a worker failure event, with a chance that the in-coverage notification from the relay 34 is "lost" and MOP 40 does not receive the notification. If there are no messages in its job queue when the worker comes back online, it will not mark the queue as in-coverage and therefore will not send MOP an in-coverage notification. In this case the source will remain marked out-of-coverage in MOP and potentially never be polled for an incoming source mail. Essentially, the problem is that the worker 24 only knows about users that have messages being processed. If for some reason all jobs in the worker have been completed, but the MOP has the user flagged as out-of-coverage, there is no way for the worker 24 to know whom to poll the status for (the user does not exist as far as the worker is concerned). The worker only requests user information when new jobs come into the system. In this "race condition case" no new mail will arrive because the MOP has stopped polling and the user would remain marked out-of-coverage.

To avoid the situation described above, the MOP 40 periodically conducts a "fail safe poll" for all pollable and out-of-coverage sources (a pollable source is not suspended or otherwise disabled). In other words, the worker 24 will correct the MOP if a race condition or error condition occurred that was not otherwise detected.

One way of doing this is for the MOP DA Proxy 42 to poll the worker for out-of-coverage status. This polling is triggered by the polling interval for the source mailbox by the source scheduler 104. If the worker knows this user is still out of coverage, it will report it as so otherwise, i.e., it is sending messages to an in-coverage user, or does not know about the user at all, and it will report an in-coverage status. This approach has the following advantages: a) in most cases, mail flow/polling will resume immediately as soon as the user comes back in coverage, b) if the system misses notifications or come out of order, the system will have a fail safe poll that can discover/report status and sync up relatively quickly if necessary, and c) in the case of a worker crash, the DA Proxy will poll the worker 24 who gets reassigned the out-of-coverage user and the worker will report inc-overage since it does not know anything about this user.

The partition database 58 places a timestamp on each source that specifies the last time the source was changed. Two queries are provided. The first query simply returns the entire list of sources in the partition and a timestamp that can be used in the second query. The second query, given a timestamp from the last query, returns all sources changed since the last query and another timestamp to use in the next query.

There now follows details of the MOP 40 related to polling to better understand the out-of-coverage notification process.

The Source Assignment Manager 60 is a partition-level service, which is responsible for ensuring that all sources of a partition are being serviced.

The SAM 60 maintains a list of all sources belonging to its configured partition. For each source in the list it tracks data related to uniquely identifying each source. Furthermore, the DA Proxy 42 assignment and directory node assignment are tracked to enable notifications of re-assignment and/or lessen reassignment due to DA Proxy and directory failure.

A timestamp is also tracked. The timestamp is a value returned by the database that can be used to retrieve sources that have changed since the last query. The SAM maintains the SrcMboxId, MboxAcctId in addition to the PIN and ServiceBookId since the SrcMboxId and MboxAcctId are properties of a source as opposed to the PIN and ServicebookId and help the SAM verify the identity of a source after pin changes.

When the system is started, it is the responsibility of the Source Assignment Manager (SAM) to begin assignment of all sources to DA proxies. The following is the sequence of steps for assigning all sources:

1) Register with Directory for event notifications. The SAM will register for DA and Directory failure events.
2) Call the Partition DB to acquire a list of all existing sources. The database will also return a tag or timestamp which can be used to query for any new or changed sources.

3) For each source, call the Directory in one or more batches to get DA Proxy assignments and cache this information.

4) Group sources by the DA Proxy they were assigned.

5) Make a batch call to each DA Proxy containing assigned sources.

6) Each DA Proxy upon receiving the assignments adds the sources to its source queue.

Periodically, the SAM 60 will query the database for all sources that are new or changed using the timestamp that was returned in response to the query made at startup. It will then send out notifications to the DA Proxy for each of these sources. This step is necessary to "ensure" that all sources are being polled. By default, a sweep will be run every 15 minutes since the previous sweep. This interval will be configurable.

The SAM will cache DA Proxy assignment information. The advantages to caching this information are as follows:

1) In the case of DA Proxy failure, it allows the SAM to do a directory lookup only for those sources assigned to the failed DA Proxy. Otherwise, the SAM will have to do a database lookup to find sources that have changed since the last query by using the timestamp returned by the last query.

2) In the case of Directory failure, it allows the SAM to suggest to the Directory which DA Proxy it should map each source to in order to reduce the amount of reassignment.

3) In both types of failures (DA Proxy and Directory 56), a database hit is avoided to find all the changed sources, since the last timestamp, in the partition since the information is cached. The DA Proxy 42 is responsible for servicing and managing the sources that are assigned to it by the SAM 60. The Source Scheduler 104 manages and services the sources and can initiate subscriptions. The Source Scheduler 104 maintains all sources to be polled in a priority queue based on a priority heap. The queue is always sorted in the order in which sources are to be polled. The head of the queue is the least element with respect to the specified ordering which is nextPollTime.

The scheduler will pick each source from the head of a queue that is due for polling, set its lastPickedTime as "Now" and submit it to the DA processing queue. It will then calculate the nextPollTime and insert it back into the queue. The source will also be marked as being "in progress". Once the polling job is completed by DA, it will callback to the scheduler to report the completion of processing using the pollResult( ) interface method. The callback will be used to clear the "in progress" state of the source. If a source which is still "in progress" becomes due for polling, it would mean that the DA Proxy is running behind and hasn't gotten around to the last polling job yet and it will be punted back in the queue with a new nextPollTime.

A source will be submitted to the DA Proxy processing queue for polling if it has a nextPollTime<=Now. Otherwise, the scheduler will stay idle. Such a situation would indicate that the system is running ahead on its polling schedule. Instead of staying idle, the scheduler could allow polling to continue even if it is running ahead. However, in order to avoid too frequent polling attempts to remote servers a property could be defined that specifies how far ahead the system can run. For example, if it is set to 5 minutes, it will guarantee that there are at least 10 minutes between two successive polls assuming the regular polling interval is set to 15 minutes, i.e. sources with (nextPollTime−runAheadTime)<=Now will be scheduled for polling.

The process of "expediting" a poll on a source would mean moving the source towards the head of the queue in order to be polled before its next scheduled poll. For "invalid" accounts that change state to "valid" due to external actions, this would mean moving the nextPollTime to "now" whereas for sources that saw new mail in the current poll, it would mean moving the nextPollTime to "now+x" where x is say 3 minutes.

The DA proxy receives notifications from the Source Assignment Manager which specifies a list of sources to add, remove or update from the source scheduler. The notification can also specify that this is a "refresh" notification in that it will list all the sources to be serviced by the DA Proxy, which means the current list of sources being serviced should be removed. The "refresh" notification will be used by a backup SAM when it takes over for the primary SAM due to failure. The interface method notificationFromSAM( ) will be used to update the scheduler in this case.

NewMail notifications from the EventServer 46 for subscribed sources will cause the source to be expedited to "Now" in the scheduler. If a NewMail notification is received for a subscribed source which has the "in progress" flag set, either due to two or more successive NewMail notifications from the Event Server or due to its nextPollTime<=Now because of inactivity, then the source will be marked as "ExpeditePollPending" and expedited when the current polling job completes.

Once a polling job is complete, when the polling handler calls back into the scheduler to report completion of the job, a new Subscription job will be created for those sources that are not currently subscribed but meet the criteria of being "subscribable" and added to the DA processing queue only if the system could successfully login to the source mailbox.

There now follows details of the out-of-service notification process.

The Source Scheduler 104 receives a relay pushback request for each source or device that is out-of-coverage. The purpose of handling relay pushback requests in the MOP is to:

1) Save bandwidth and not poll sources that are out of coverage.

2) Resume polling sources when a user comes back into coverage.

3) Reduce the number of messages that have to be cached on disk in the Workers 24.

In the Engine 22, messages are stored/queued and submitted to the Relay 34 based off of a PIN/SB. Furthermore, Relay implements pushback on a per message basis. Thus, every message submitted to the Relay 34 can be "pushed back" if the user is out of coverage. Each message queue in the worker (i.e., PIN/SB combo) keeps track of these push-backed messages and determines if the user is in or out of coverage. Hence, each queue will send an "out-of-coverage" or "in-coverage" flag to the MOP 40.

The pushback flag is on the source level rather than the user level because it does not involve de-multiplexing the multiple source levels into one user level, and makes the race condition of the update easier to be controlled. The MOP 40 receives one notification per source that has at least one pending message in the worker. The worker can allow at least one job for each service book (max 11 service books) to be sent to device. There can be 11 updates to a DA proxy in this non-limiting example each time the device is in and out of coverage.

If the Worker 24 accepts MTH's from the DA Proxy 42 while a device is out of coverage, those messages are NOT lost. When the device comes back into coverage, the messages are retried and sent to the device. The Worker will keep them until the device is back in coverage or until some previously sent jobs expired, for example, after 7 days from a Port Agent 26 to make room for next pending job(s) to be sent out.

The following describes the nature of the relay-pushback in the Engine 22:

1) The Worker 24 has x messages (where x>0) that it has converted and submitted to Relay.

2) Relay pushes back y messages (where y>0). In theory, x=y, but it does not have to be, given the unreliable nature of this protocol from the Relay side.

3) Of the y messages, 1 is marked as a KEEP job. A KEEP job is retried periodically (every 4 hours) as a safety measure. Therefore y−1 messages are put back into the queue and the queue is marked as "out-of-coverage". The y−1 messages are not resubmitted while in this state, and any new incoming messages are not submitted for delivery. Messages are queued in the Worker.

4) Two events can signal an "in-coverage" status:
   a) Relay notifies that user has come back in coverage, or
   b) The periodically resubmitted KEEP job comes back as DELIVERED. Queue is marked as "in-coverage" and messages in the queue are resubmitted (following the "max number of assigned jobs per PIN/SB rule", as per usual).

A device going in and out of coverage (this might happen if a device is near a weak signal) results in the Relay 34 making pushback requests relatively frequently to the Worker. There is no assurance that these requests will never become out-of-order along the way to the Worker. Furthermore, because of the asynchronous nature of the Engine 22, the MOP and Relay protocols make for an endless number of sequences and magnifies the possibility of a race condition between out-of-coverage notifications and in-coverage notifications. The Worker needs to either keep notifications in sync, or detect and disregard out-of-sync notifications.

There is also the issue of a Worker failure event, with a chance that the in-coverage notification from the Relay 34 is "lost" and MOP 40 does not receive the notification. If there are no messages in its job queue when the Worker comes back online, it will not mark the queue as in-coverage and therefore not send MOP an in-coverage notification. In this case, the source will remain marked out-of-coverage in the MOP and, potentially never be polled for incoming source mail Essentially, the problem is that the Worker only knows about users that have messages being processed. If, for some reason, all jobs in the Worker have been completed but the MOP has the user flagged as out-of-coverage, there is no way for the Worker to know whom to poll the status for because the user does not exist as far as the Worker is concerned. The Worker 24 only requests user information when new jobs come into the system, but in this "race-condition case" no new mail will come in since the MOP has stopped polling and the user would remain marked out-of-coverage.

To avoid the situation described above, MOP periodically accomplishes a "fail-safe poll" for all pollable and out-of-coverage sources where a pollable source is not suspended or otherwise disabled. The Worker 24 will correct the MOP if a race condition or error condition occurred that was not otherwise detected.

One way of doing this is for the MOP DA Proxy 42 to poll the Worker 24 for out-of-coverage status. This polling is triggered by the polling interval for the source mailbox by the Source Scheduler 104. If the Worker knows this user is still out of coverage it will report it as so, otherwise, i.e., it is sending messages to an in-coverage user, or doesn't know about the user at all, and it will report an in-coverage status. This approach has the following advantages: a) In most cases, mail flow/polling will resume immediately as soon as the user comes back in coverage, b) if notifications are missed or come out of order, the system will have a fail-safe poll that can discover/report status and sync up relatively quickly if necessary, and c) in the case of a Worker crash, the DAProxy will poll the Worker who gets reassigned the out-of-coverage user, and the worker will report in-coverage since it does not know anything about this user.

The Source Scheduler 104 periodically triggers the DA Proxy 42 to send a fire-and-forget notification to the Worker 24. In response, if the Worker determines the source is in-coverage, updates the out-of-coverage notification status to 'false' thereby indicating that the source is back in-coverage status. In the event the fire-and-forget notification is lost or the Worker is down, then the Worker will not send an in-coverage notification update to MOP and the source state will remain out of coverage.

FIG. 15 is a sequence diagram of the notification communication transactions.

All sources in an account should be considered out-of-coverage if one source in the account receives a pushback notification from the relay. Part of this optimization could be implemented in the MOP to mark all sources out-of-coverage. However, the most benefit would probably be gained if the engine 22 were optimized to consider relay pushbacks at the account level and tie the queues together at the account level. Otherwise any messages already in the queue will continue to be retried.

The worker need not respond with an "out-of-coverage ACK" when the MOP polls it for out-of-coverage sources. It only needs to respond to have MOP mark in-coverage. This would save some of the overhead of processing out-of-coverage requests and responses.

Exemplary components of a hand-held mobile wireless communications device 1000 that may be used in accordance with such a system are further described in the example below with reference to FIG. 1. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 1. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as email messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

This application is related to copending patent applications entitled, "DIRECT ACCESS ELECTRONIC MAIL (EMAIL) DISTRIBUTION AND SYNCHRONIZATION SYSTEM WITH IMAP-IDLE IMPLEMENTATION," and "DIRECT ACCESS ELECTRONIC MAIL (EMAIL) DISTRIBUTION AND SYNCHRONIZATION SYSTEM WITH EXTERNAL SMTP SERVER SUPPORT," which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
    a network engine that communicates with a plurality of user subscribed mobile wireless communications devices; and
    a direct access server comprising at least one hardware device having a processor and a data store storing data regarding electronic mailboxes of different users and configured to:
    operate with the network engine to poll electronic mailboxes of different users, retrieve electronic messages from the electronic mailboxes and push any electronic messages through the network engine to selected user subscribed mobile wireless communications devices;

suspend polling of those electronic mailboxes of a particular user when a mobile wireless communications device associated with that particular user is determined to be out-of-coverage; and periodically poll the network engine for out-of-coverage status of the mobile wireless communications device to determine when a previously out-of-coverage mobile wireless communications device is now in-coverage.

2. The communications system according to claim 1, wherein said network engine further comprises a worker module that accepts email from the direct access server and any mail routers and formats email for communication across a communications network and a relay module that receives messages from the worker module and pushes the messages to mobile wireless communications devices through the communications network.

3. The communications system according to claim 2, wherein said relay module is operative for pushing back messages to the worker module when a mobile wireless communications device is out-of-coverage or turned-off and messages cannot be pushed to such device.

4. The communications system according to claim 3, wherein said relay module pushes back messages to a worker module on a per message basis such that every message the worker submits to the relay module can be pushed back to the worker module.

5. The communications system according to claim 3, wherein said worker module is operative for maintaining a record of the number of messages pushed back from the relay module and determining from the number of pushed back messages whether the mobile wireless communications device in which intended messages have been pushed back is out-of-coverage.

6. The communications system according to claim 2, wherein said direct access server comprises a proxy through which messages are delivered to or retrieved from the worker.

7. The communications system according to claim 6, wherein said proxy is configured to poll mailboxes.

8. The communications system according to claim 7, wherein said network engine is configured to validate access settings to a mailbox.

9. The communications system according to claim 1, wherein said network engine is operative for sending an out-of-coverage or in-coverage flag to the direct access server indicating that the mobile wireless communications device to which emails are intended is out-of-coverage or turned-off.

10. The communications system according to claim 1, wherein said direct access server is operative to resume polling of those electronic mailboxes to which polling has been suspended when the associated mobile wireless communications device of the user is in-coverage or turned on and able to resume communications.

11. The communications system according to claim 1, and further comprising a HTML proxy configured to provide an HTML user interface for users to manage their accounts.

12. The communications system according to claim 1, and further comprising a WAP proxy configured to provide a WML and XHTML user interface.

13. The communications system according to claim 1, wherein said direct access server comprises a data store that stores system wide data related to sites/carriers and mailbox providers.

14. The communications system according to claim 1, wherein said direct access server comprises a data store that stores system wide data related to devices and user accounts.

15. The communications system according to claim 1, and further comprising a directory configured to assign, locate and distribute users and associated workloads across service instances.

* * * * *